E. HEDENSKOOG.
AUTOMATIC PIN SETTING MACHINE.
APPLICATION FILED FEB. 13, 1914.
1,190,646.
Patented July 11, 1916.
8 SHEETS—SHEET 1.
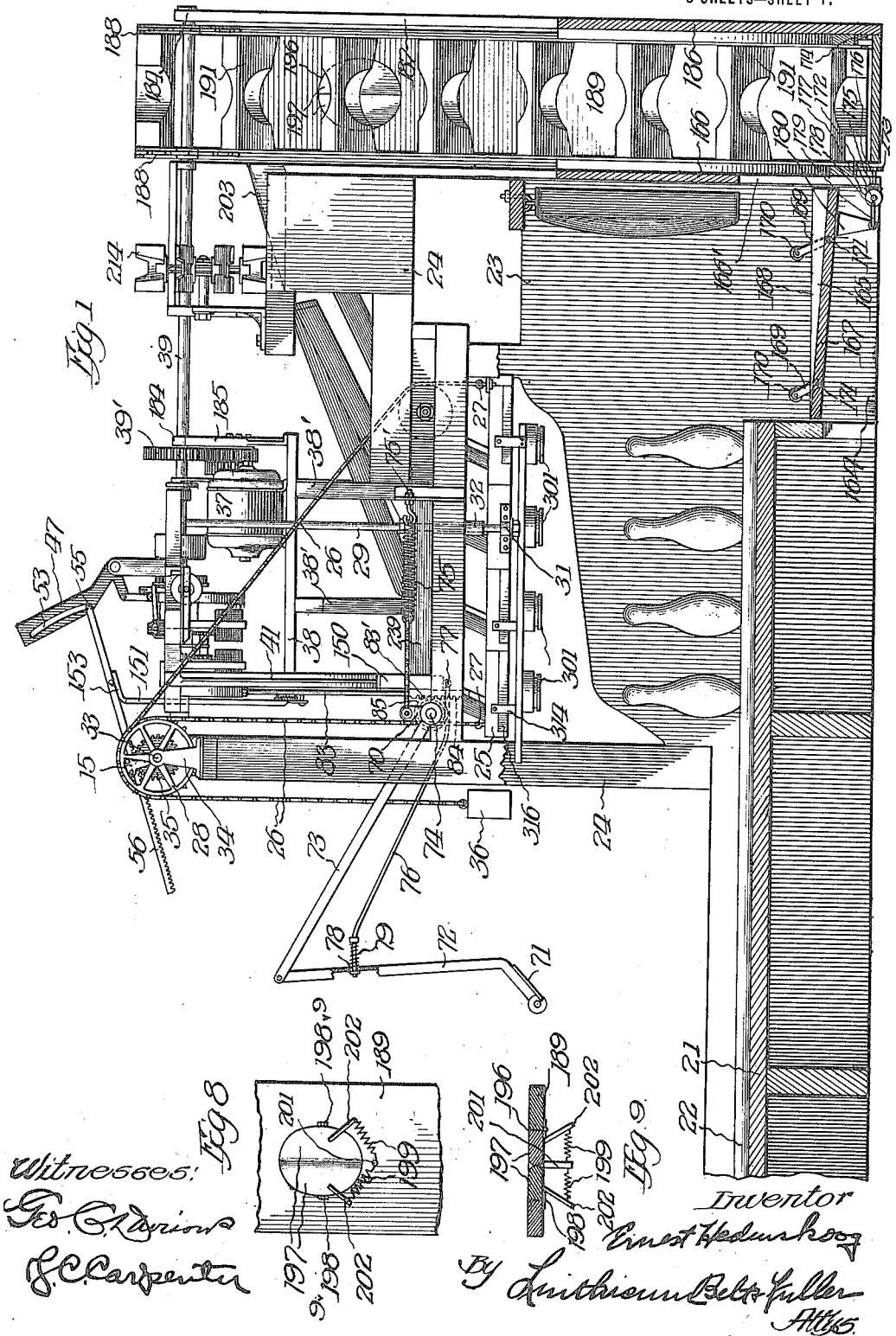

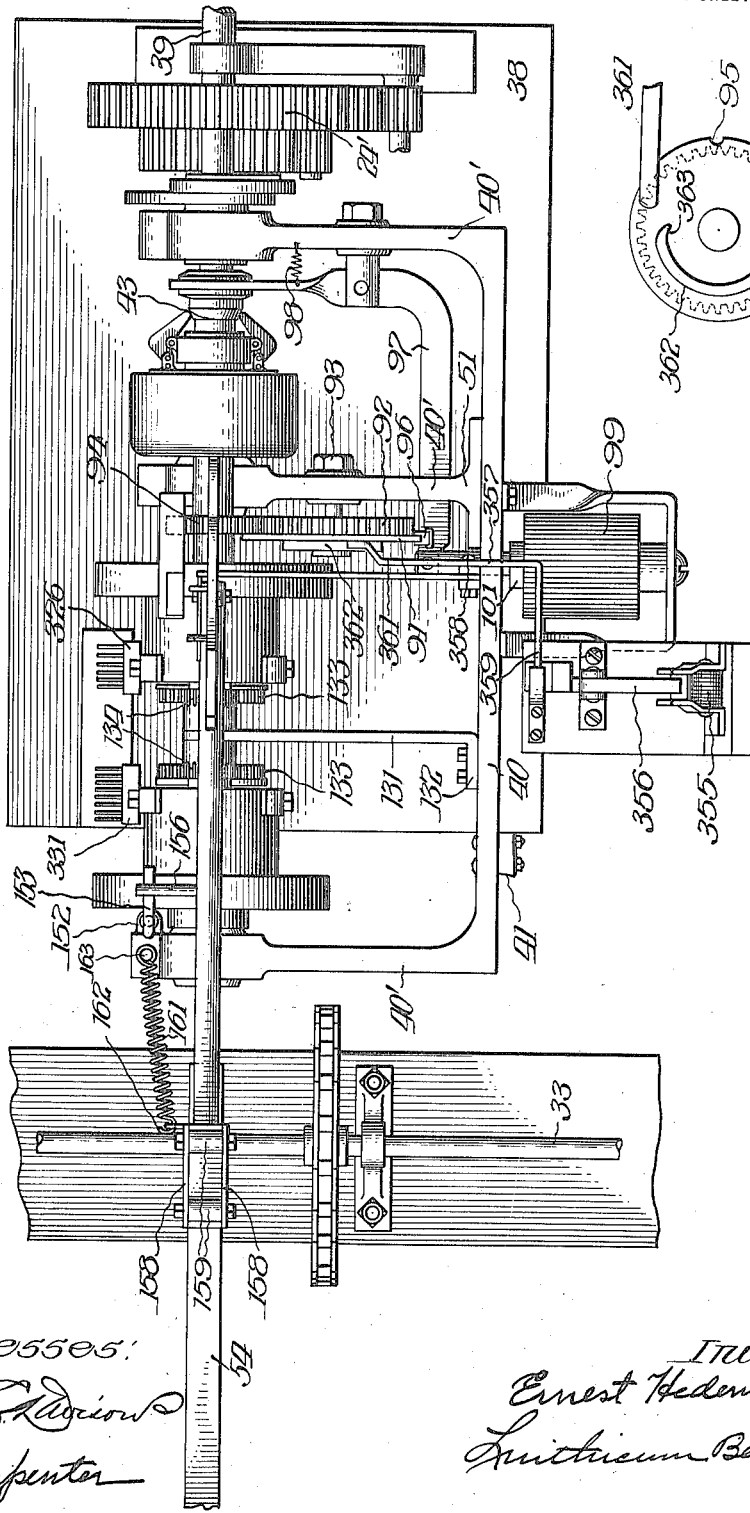

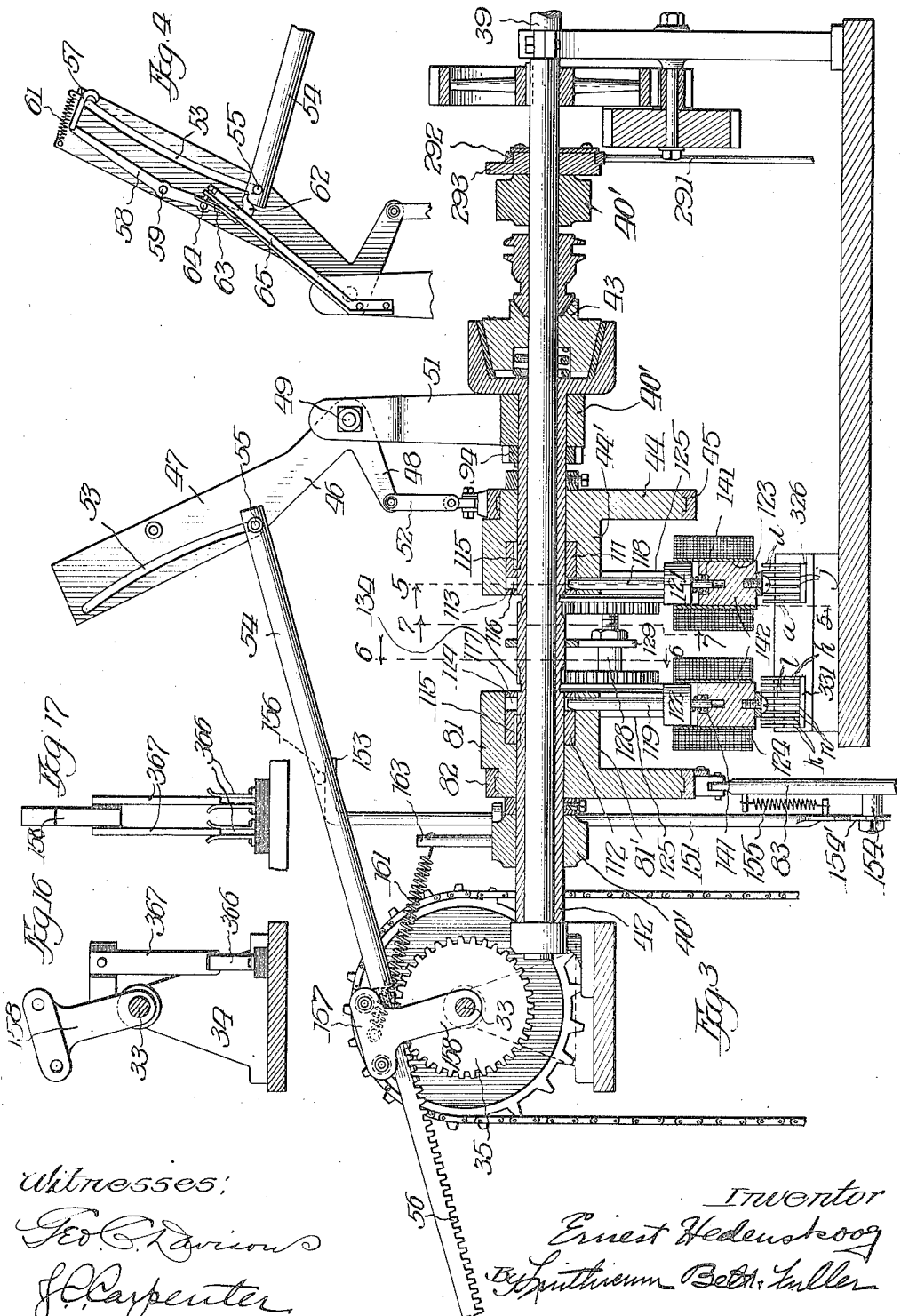
E. HEDENSKOOG.
AUTOMATIC PIN SETTING MACHINE.
APPLICATION FILED FEB. 13, 1914.
1,190,646.
Patented July 11, 1916.
8 SHEETS—SHEET 3.

E. HEDENSKOOG.
AUTOMATIC PIN SETTING MACHINE.
APPLICATION FILED FEB. 13, 1914.
1,190,646.
Patented July 11, 1916.
8 SHEETS—SHEET 4.
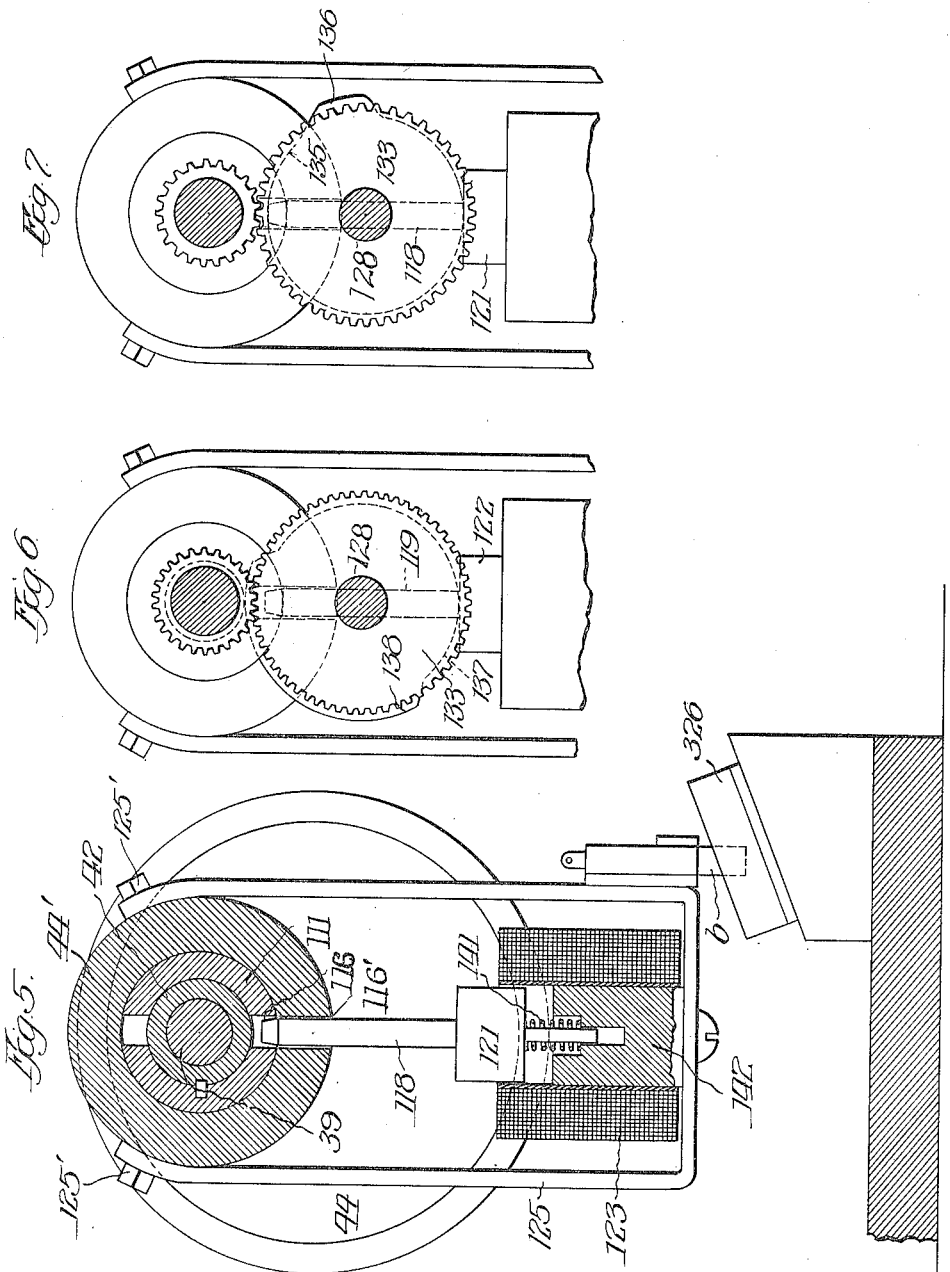

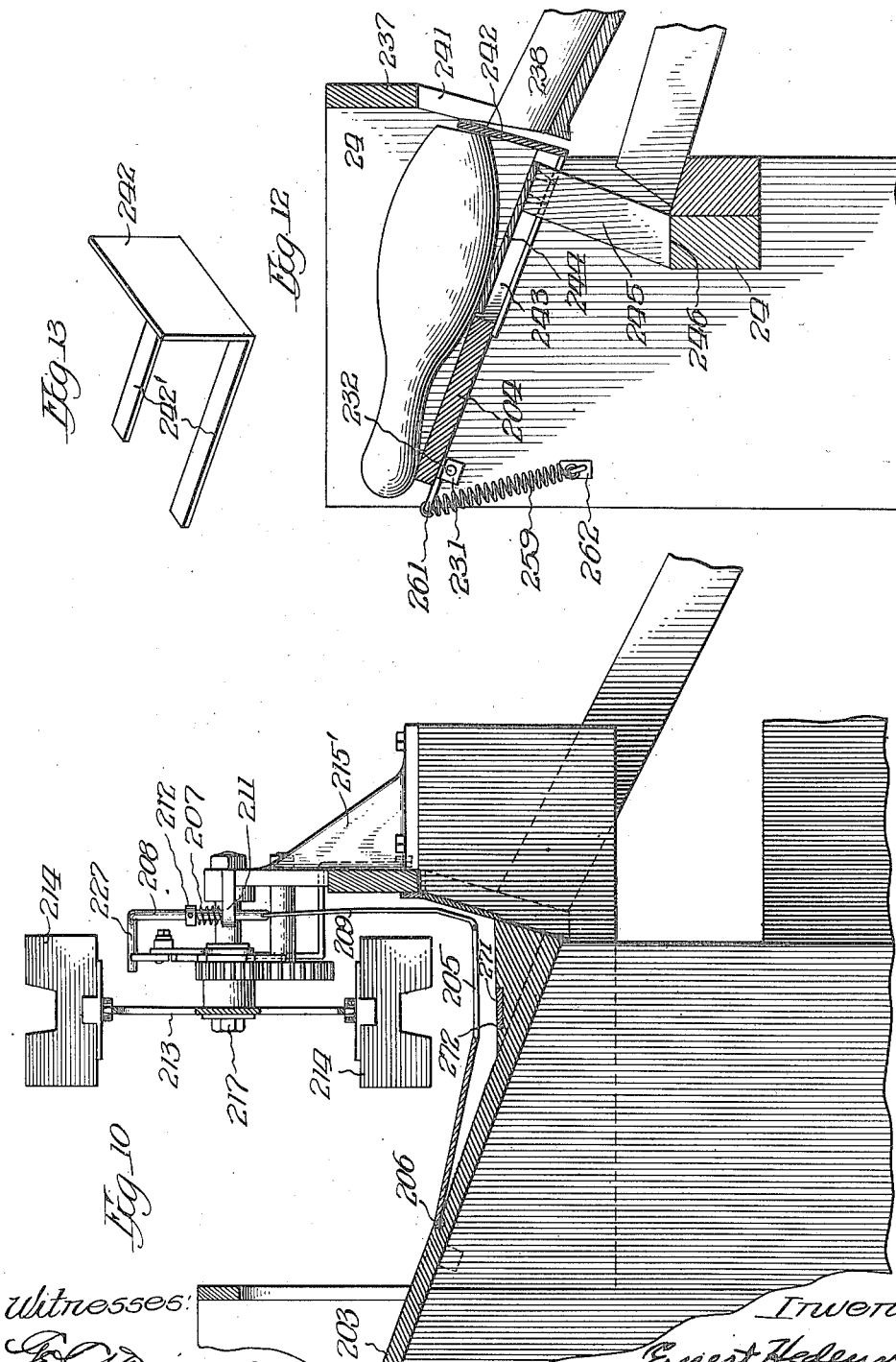

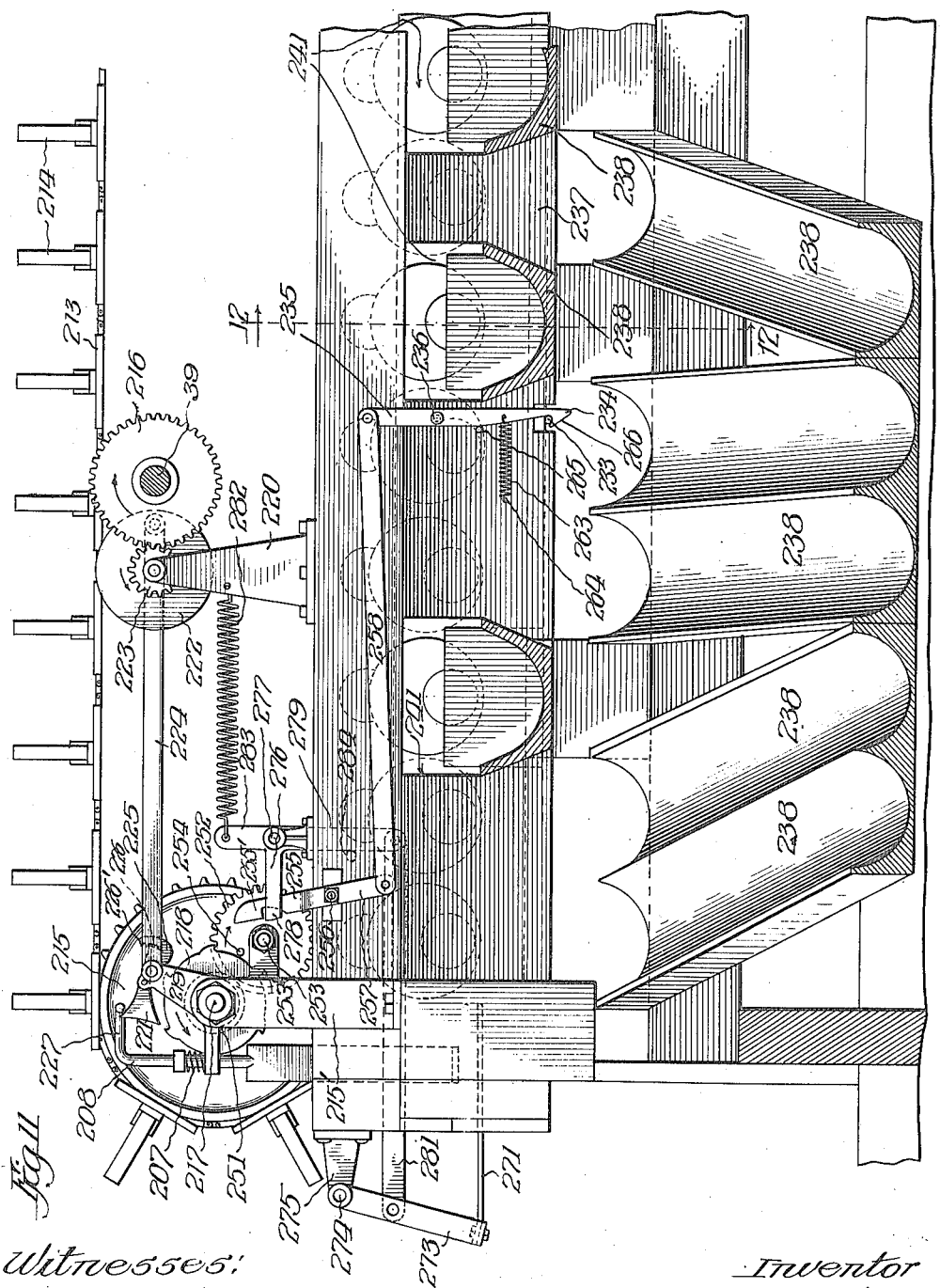

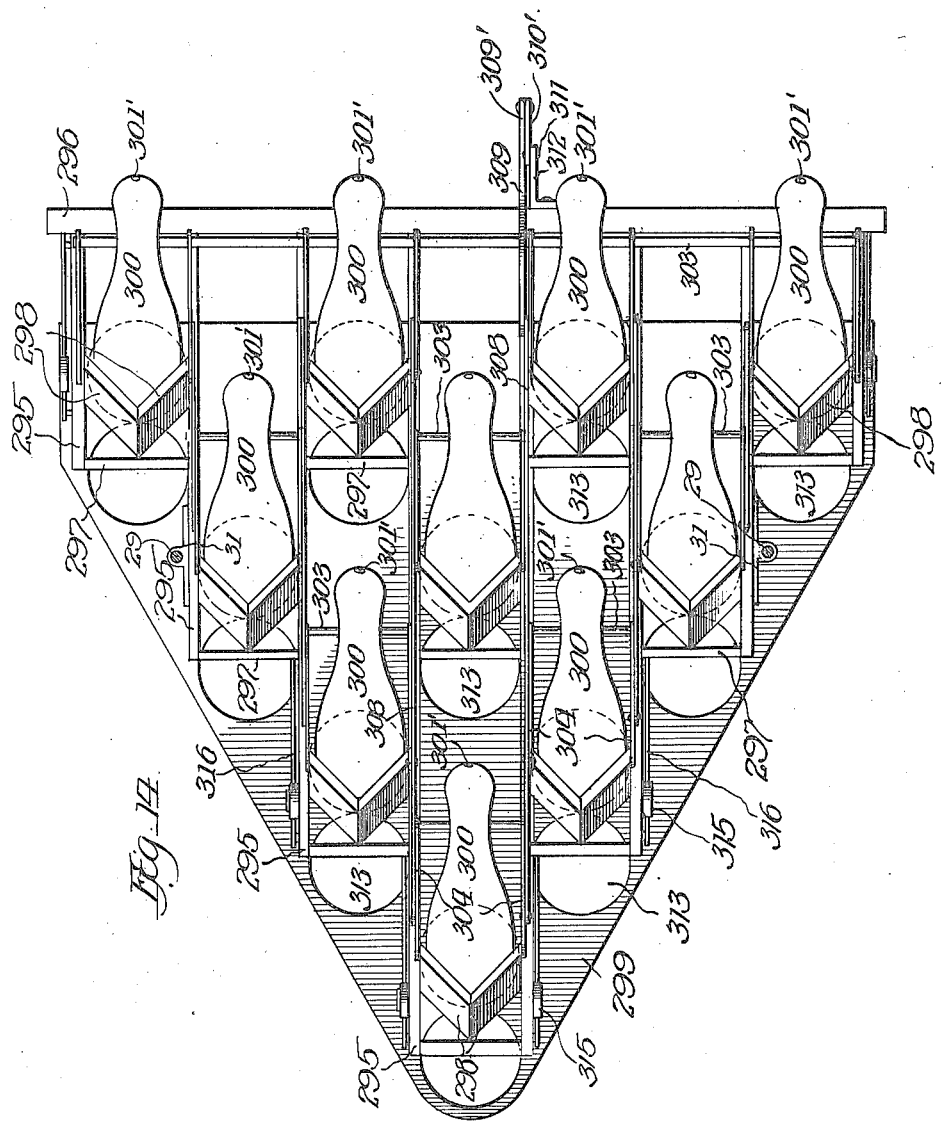

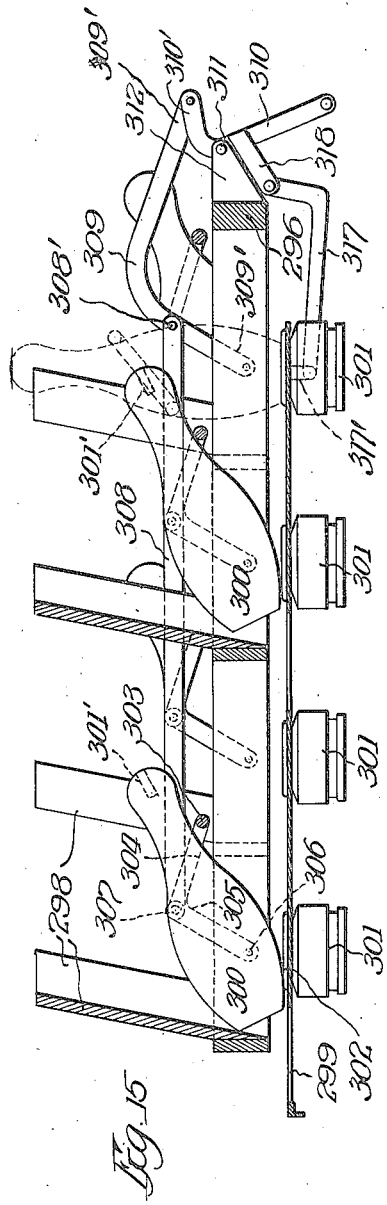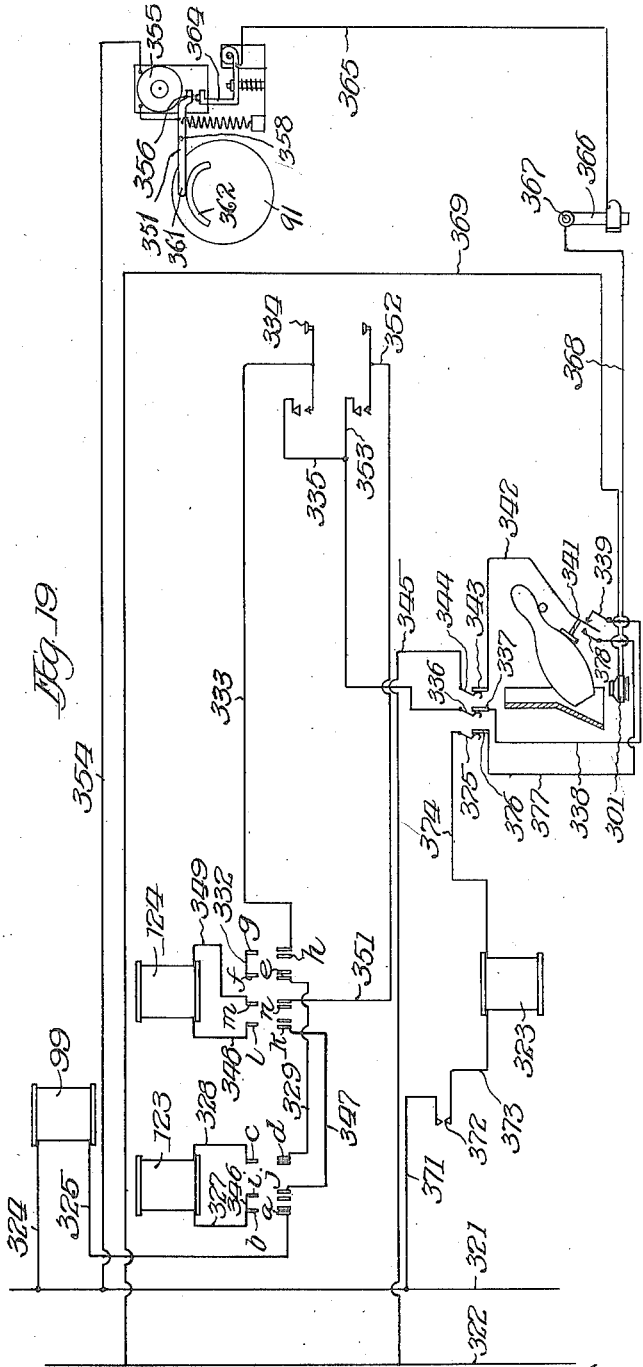

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

1,190,646.          Specification of Letters Patent.      Patented July 11, 1916.

Application filed February 13, 1914. Serial No. 818,449.

*To all whom it may concern:*

Be it known that I, ERNEST HEDENSKOOG, a citizen of the United States, residing at Muskegon, in the county of Muskegon and State of Michigan, have invented certain new and useful Improvements in Automatic Pin-Setting Machines, of which the following is a specification.

The object of the present invention is broadly to provide a machine to do all the work of a pin boy in setting pins upon a bowling alley and returning the ball to player's position, including devices and mechanisms wholly under control of the player which will remove the deadwood from the alley, deliver the ball to the return track and the pins to a setter frame; which will clear the alley and set the pins in proper position upon the alley bed and which will perform each of these operations more quickly and accurately than they have been performed by the pin boy.

The invention has relation to the machine forming the subject matter of my application filed September 6, 1913, Serial Number 788,410, and presents certain novel mechanisms and devices and combinations and arrangements of parts which may be employed in such a machine.

On the drawings: Figure 1 is a side elevation of a pin setting machine embodying my new and improved mechanisms shown in position upon a bowling alley with parts of one of the alley side walls broken away to more completely disclose the same; Fig. 2 is an enlarged top plan view of the mechanism provided to control and time the operations of the pin setter and sweeper; Fig. 3 is a longitudinal vertical section of said controlling device; Fig. 4 is a detail view of the bell-crank provided to operate the pin setter, showing the locking mechanism; Fig. 5 is a transverse section taken substantially on the line 5—5 of Fig. 3; Fig. 6 is a transverse section taken substantially on the line 6—6 of Fig. 3; Fig. 7 is a similar view taken on the line 7—7 of Fig. 3; Fig. 8 is a fragmentary side elevation of the casing of the elevating mechanism showing the doors through which the balls are delivered; Fig. 9 is a horizontal section on the line 9—9 of Fig. 8; Fig. 10 is an enlarged partial sectional view taken longitudinally of the machine and showing the bottom of the chute down which the pins slide to the assembly shelf; Fig. 11 is an enlarged partial front elevation of the assembly shelf and the mechanism for moving the pins onto the same; Fig. 12 is a transverse section taken substantially on the line 12—12 of Fig. 11; Fig. 13 is a perspective view of one of the abutments secured to the assembly shelf; Fig. 14 is an enlarged top plan view of the pin setter frame; Fig. 15 is a vertical section through the same; Fig. 16 is a side elevation of a rocker arm provided to retain the driving rod in coöperative relation with the pinion actuating the setter frame, showing the switch provided to prevent the energization of the pin lifting magnets during a new set operation; Fig. 17 is an end elevation of the same; Fig. 18 is a side elevation of the disk provided to hold the main clutch in operative engagement, showing the arm of the switch controlling the time of energization of the pin lifting magnets, and Fig. 19 is a diagram of the electric circuits provided in connection with the present embodiment of my invention.

A pin setting machine in which are embodied the various mechanisms and devices forming the subject-matter of the present invention is shown set up at the pit end of a bowling alley (Fig. 1). The alley comprises the usual bed 21, gutters 22 and side walls or "kick-backs" 23, upon the latter of which a suitable main frame 24 is supported. A pin setter comprising a frame 25 and various other parts to be later described is mounted to move vertically in the main frame 24 and is normally retained in elevated position by chains 26 fastened at 27 to the frame and passing over sprocket wheels 28, means being provided to actuate the sprocket wheels at appropriate times to lower and raise the pin setter frame. This frame is guided in its movement by suitable guiding rods 29 rigidly fastened at their lower ends at 31 to the frame 25 and passing through fixed guides 32 suitably secured above the elevated or normal position of the pin setter frame. The sprocket wheels 28 are fixed upon a shaft 33 journaled to turn freely in brackets 34 upon the top of the main frame 24 and upon this shaft a pinion 35 is fastened which imparts movement to the sprocket wheels 28 in response to the pressing of a button at the player's end of the alley. A counterweight 36 is secured to the free ends of the chains 26 and reduces materially the power needed to raise and lower the frame as the machine is operated.

The pinion 35 and all other relatively moving parts of the pin setting machine receive their power from a motor 37 mounted upon a shelf 38 secured above the main frame 24 by supports 38'. This motor continuously drives a main power shaft 39 (Figs. 1, 2, 3) through a suitable chain of gearing 39' connecting the two. The shaft 39 is journaled at its forward end in three arms 40' of a long bracket member 40 which is supported in horizontal position above the shelf 38 by the shaft 39 at one side and by an arm 41 secured upon the main frame 24 at the other. The two outer arms 40' are spaced apart a sufficient distance to permit the various devices and mechanisms provided to control and time the operations of the pin setting machine to be positioned between them. A sleeve 42 which for the purposes of the present invention may be considered a hollow shaft embraces the main power shaft 39 and is adapted to be locked thereto at appropriate intervals by a clutch 43 of any preferred construction. A cam or eccentric 44 (Fig. 3) carrying a band 45 is loosely mounted on the sleeve 42 and a bell-crank 46 having a long arm 47 and a short arm 48 is pivoted at 49 to a support 51 fastened above the shaft 39 upon the middle arm 40' of the bracket member 40 so that the end of the short arm 48 of the bell crank is above the band 45. The free end of this arm is connected by a link 52 to the band 45 so that rotation of the eccentric causes the bell-crank to oscillate vertically about its pivot 49. The long arm 47 of the bell-crank is provided with an elongated slot 53 in which a driving rod 54 for the pinion 35 is connected by a pin 55. The driving rod extends outwardly over the pinion 35 and is provided along its lower surface with a rack 56 adapted to engage with the teeth of the pinion 35 to rotate the pinion as the bell-crank 46 is moved by the eccentric.

The pin setting machine embodying my invention performs two separate main operations, one setting the pins in proper position upon the alley bed and the other removing the deadwood after the first ball has been rolled along the alley. In the first operation the pin setter frame is lowered to just above the alley bed and from this position deposits the pins accurately upon the spots. In removing the deadwood the frame is lowered only to the height of the standing pins which it lifts above the alley while the pins which have fallen upon the alley bed are swept into the alley pit, as will be later described, after which operation the pin setter frame returns and replaces the standing pins. The travel of the frame is, therefore, different in the two operations and this difference of travel is attained in accordance with my present invention by varying the distance of the point of connection of the driving rod 54 with the long arm 47 of the bell-crank from the pivotal axis of the bell-crank. In Fig. 4 the pin 55 which connects the bell-crank and driving rod is shown located at the lower end of the slot 53, i. e. the end of the slot nearest the pivotal axis of the bell-crank, which is the position throughout the deadwood operation. When it is desired to make a new set the rod 54 is lifted, as will be hereinafter explained, until the pin 55 engages the upper end of the slot 53 where it is locked in position by a hook 57 mounted upon the end of a lever 58 pivoted at 59 adjacent a side of the slot. The lever is normally moved to bring the hook 57 in locking position by a spring 61 connected at one end to the hook 57 and at the other end to the bell-crank. The lever 58 is provided at its lower end with a second hook 62 adapted to engage over the pin 55 when the driving rod is in its lower or normal position, the movement of the lever under the force of the spring 61 serving to bring both the hooks 62 and 57 across the slot at the same time so that the end of the driving rod 54 will be locked in the end of the slot at which it is located. When the bell-crank is in normal position the lever 58 is moved by the engagement of two stops 63 and 64 to dispose the hooks 57 and 62 in inoperative position, the stop 63 being located upon the end of a bar 65 fastened upon the support 51 and the stop 64 upon the lever in proper position to engage the stop 63.

A sweeper blade 71 (Fig. 1) carried upon the ends of arms 72 is provided to move along the alley bed, as will now be described, to remove the deadwood after the pin setter frame has lifted the standing pins and to clear the alley bed before the operation of the pin setter frame in making a new set. The arms 72 extend upwardly and are pivoted at their upper ends to arms 73 which are fixedly secured upon a shaft 74 loosely journaled in a main frame. Mechanism is provided to turn the shaft 74 in a counter-clockwise direction at proper times to lower the arms 73 and move the sweeper rearwardly along the alley bed and back again in a clockwise direction to return the sweeper to normal position. The arms 73 are normally held in the elevated position shown in Fig. 1 to maintain the sweeper above the alley bed, partly by a counter-balancing spring 75 fastened at one end to the main frame at 75' and at the other end to a short arm 70 rigid on the shaft 74, and partly by the device provided to actuate and control the sweeper. The sweeper is guided in its movement by rods 76 pivoted in the main frame at 77 and extending through slotted openings 78 in the arms 72, springs 79 being provided to steady the movement of the sweeper.

The mechanism for operating the sweeper consists of a cam or eccentric 81 (Figs. 2, 3) mounted loosely upon the sleeve 42 with the eccentric 44, a band 82 embracing said eccentric and a rod 83 extending downwardly from said band and provided with a rack 84 (Fig. 1) at its lower end which engages in and actuates a pinion 85 rigidly mounted upon the shaft 74. When the eccentric 81 is locked to the sleeve 42 rotation of the sleeve 42 imparts a vertical reciprocation to the rod 83, imparting thereby an angular movement to the pinion 85 and moving the sweeper back and forth along the alley bed.

The operations of the sweeper and pin setter frame are controlled and timed by a mechanism which will now be described. This mechanism consists of a device for throwing in the clutch 43 to operatively connect the sleeve 42 with the shaft 39 during two complete revolutions and means for rendering the eccentrics 44 and 81 inoperative at proper intervals. When a new set is to be made it is desirable that as soon as the sweeper has finished its rearward or sweeping movement along the alley bed the pin setter frame should start downwardly to deposit a set of pins upon the alley. The timing mechanism to be now described causes the eccentric 81 to rotate with the sleeve 42 as soon as the sleeve 42 is locked to the shaft 39. The first half revolution of the shaft 39 moves the sweeper rearwardly along the alley bed to clear the alley, at the end of which time the eccentric 44 is engaged with the sleeve 42 and the pin setter frame is started downwardly toward the alley bed. At the completion of the first whole revolution of the shaft 39 the sweeper has returned to normal position and the eccentric 81 is automatically released from the sleeve 42. At this point in the operation the pin setter frame is in its lower position and is depositing pins upon the alley bed. The frame returns empty and arrives at its upper or normal position at the completion of the next half revolution of the shaft at which point the eccentric 44 is released and the new set operation is completed.

The deadwood operation consists of lifting the pins left standing on the alley bed by magnets carried by the pin setter frame, then sweeping the alley of the fallen pins by the sweeper and thereafter replacing the pins lifted by the pin setter frame upon the alley bed. In this operation the pin setter frame must first descend to pick up the standing pins and this descent is accomplished during the first half revolution of the shaft 39 during which time the eccentric 44 is locked to the sleeve 42 and the eccentric 81 governing the sweeper is inoperative. At the completion of this first half revolution the eccentric 81 is engaged with the sleeve 42 and the sweeper starts rearwardly to remove the fallen pins, and the pin setter frame begins its movement upwardly with the standing pins. The pin setter frame reaches its upper position and the sweeper the rear of the alley at the completion of the first revolution. Both eccentrics are still locked to the sleeve 42 and the sweeper returns as the frame descends to return the standing pins. At the end of the first half of the second revolution the sweeper is in normal position and the eccentric 81 is automatically disconnected from the sleeve 42. At this point in the operation the pin setter frame is replacing the standing pins and the eccentric 44 remains locked to the sleeve 42 during the remaining half revolution to carry the pin setter frame back into normal position again.

The sleeve 42 is caused to make two revolutions with the shaft 39 at each operation of the machine by a disk 91 mounted rigidly with a gear 92 upon a shaft 93 (Figs. 2, 19) journaled in the middle arm 40' of the bracket member 40. The gear 92 is in mesh with a pinion 94 splined upon the sleeve 42, the ratio of the number of teeth in the pinion 94 to the number of teeth on the gear 92 being 1 to 2, so that the pinion will make two revolutions to one of the gear. In the cylindrical face of the disk 91 a recess 95 is provided in which a roller 96, rotatably secured on the free arm of the clutch lever 97, rests while the clutch 43 is thrown out. When the clutch lever is moved to throw in the clutch the roller is withdrawn from the recess and the rotation of the sleeve 42 rotates the gear 92 and the disk 91 through the gear. The roller 96 rides upon the cylindrical face of the disk 91 after rotation is imparted to the disk and prevents movement of the clutch lever to throw out the clutch until the sleeve 42 and the shaft 39 have made two, and the disk one complete revolution at which time the recess 95 is again in position to receive the roller 96. A spring 98 normaly holds the roller 96 in the recess 95 and maintains the clutch inoperative. A magnet 99 having a movable armature 101 connected with the free arm of the lever 97 is provided to withdraw the roller 96 from the recess 95 against the force of the spring 98 to throw in the clutch.

Both eccentrics 44 and 81 are normally locked to the sleeve 42 by devices which will now be described. Each eccentric is provided with a recess 113, 114 in its hub 44', 81' in which a collar 111, 112 splined on the sleeve 42 is disposed. A pin 118, 119 extends through an aperture 116', 117' in the hub and into one of a pair of diametrically arranged recesses 116, 117 in the collar 111, 112. Outward movement of these pins will withdraw them from the recesses 116, 117 and permit the eccentrics to remain immovable while the sleeve 42 and shaft 39 revolve. It will be noted that having once been withdrawn a pin may not again lock the eccentric to the sleeve 42 until the sleeve has made a half revolution and the aperture diametrically opposite the one from which the pin was withdrawn is in place to receive it. It is, therefore, only necessary that the pins be positively pulled from the collars momentarily, the imperforate portions of the collars preventing reëngagement by the pins throughout the succeeding half revolution. The necessary unlocking during the initial steps of one of the eccentrics in each operation of the machine, the setter eccentric 44 in the new set operation, and the sweeper eccentric 81 in the deadwood operation, is accomplished electrically by magnets 123, 124 which attract enlarged soft iron heads 121, 122, respectively, provided on the outer ends of the pins 118, 119. These magnets are supported from the hubs of the eccentrics in saddles 125 so that when an eccentric revolves with the sleeve 42 its magnet swings in a circle with it. As these two saddles are of like construction only one is shown completely (Fig. 5). They each consist merely of a single strap bent in the U-shaped form shown and fastened at its ends to the hub at 125'.

A stub shaft 128 (Fig. 3) is loosely suspended from the sleeve 42 in a bracket 129, said bracket having an arm 131 (Fig. 2) secured at its outer end at 132 to the bracket 40, the arm 131 preventing angular movement of the stub shaft with the sleeve 42. Upon each end of the stub shaft is a gear 133 in continuous mesh with gear teeth 134 cut in the sleeve 42 so that rotation of the sleeve causes these gears to rotate. The ratio of the number of teeth on the sleeve to the number of teeth in each gear is as 1 to 2, so that each double rotation of the sleeve will turn the gears through 360 degrees.

Fixed to the gear 133 adjacent the eccentric 44 is a cam disk 135 (Fig. 7) having a high operative portion 136 adapted to engage the enlarged head 121 of the pin 118 to unlock the eccentric 44 from sleeve 42 at a predetermined point in the operation of the machine and on the gear 133 adjacent the eccentric 81 a cam disk 137 (Fig. 6) is fixed having a high operative portion 138 adapted to engage the head 122 of the pin 119 to unlock the eccentric 81 from the sleeve 42 at two predetermined points in the operation of the device, as will be later described. As has been set forth, the pins 118, 119 normally lock the eccentrics to the sleeve 42 and to this end are pressed inwardly of the shaft by springs 141 bearing against the heads of the pins and against the permanent core 142 of each magnet 123, 124.

The main magnet 99 and the setter and sweeper magnets 123, 124 are connected to push-buttons or switches located adjacent player's position by suitable circuits to be later described and it is intended that the complete new set operation, or the removal-of-deadwood operation, will be accomplished by momentarily closing the appropriate circuit at the button or switch. It is, therefore, only at the beginning of either operation of the machine that the magnets 123, 124 will be energized and this should occur at the same time that the main magnet 99 throws in the clutch to start the rotation of the sleeve 42. When it is desired to make a new set the pin setter frame, as has been already described, remains inactive during the first half revolution of the sleeve 42 or while the sweeper is clearing the alley bed. The magnet 123 is so connected in the new-set circuit that this magnet is energized and the pin 118 withdrawn from the aperture 116 in the collar 111 as the sleeve 42 starts to turn, thereby delaying the action of the setter until the sleeve 42 has completed a half revolution, at which time the pin 118 enters the aperture diametrically opposite the one in which it normally rests and the setter frame starts downwardly. The sweeper eccentric 81 remains locked to the sleeve 42 until the end of the first revolution of the shaft 39, at which time the sweeper has completed its work and is again in normal position. It is then unlocked and remains idle during the second or last revolution. This is effected by the high portion 138 of the cam disk 137 which engages the head 122 of the pin 119 and moves the pin outwardly and prevents its entrance into the next aperture 116 which presents itself at the end of one and one-half revolutions, whereby the pin is held inoperative until it may enter the aperture in which it normally rests.

After the shaft 39 has completed one and one-half revolutions the high portion 136 of the cam disk 135 and the head 121 of the pin 118 engage to mechanically retract the pin 118 and unlock the eccentric 44 from the sleeve 42. The gears 133 move continuously and during the last half revolution of the shaft move the high portions 136, 138 past the heads 121, 122 of the pins, so that the apertures in which the pins normally engage while the machine is idle, may receive them at the completion of the second revolution of the shaft 39 and sleeve 42. It will be apparent from the foregoing that the entire new set operation is completed in one and one-half revolutions of the shaft, the sweeper and pin setter frame both moving during the second half of the first revolution.

During the removal of deadwood it will be apparent that the eccentric 44 must be locked to the sleeve 42 throughout the two complete revolutions of the sleeve as the first half revolution carries the setter frame down into position to lift the standing pins, the second half raises the frame and standing pins above the alley bed (the frame going back to normal position with the pins), the third half revolution returns it into position to replace the pins and the fourth and last half revolution moves it back to normal position again ready for the next operation of the machine. During the removal of deadwood, therefore, the pin 118 is not withdrawn from the aperture in the collar 111 in which it normally engages.

In the removal of deadwood the action of the sweeper must be delayed until the pin setter frame has picked up the standing pins or during the first half revolution of the sleeve 42 and to this end the magnet 124 is energized when the deadwood button or switch is pressed by a player so that the magnet attracts the head 122 of the pin 119 and permits the aperture in which the pin normally rests to pass the end of the pin, so that when the circuit energizing the magnet is broken the inner end of the pin will ride on the outer face of the collar 112 until the second aperture is in position to receive the pin at which time the pin setter frame is at the lower point in its travel and is about to return to upper position with the standing pins. The pin then locks the eccentric 81 and sleeve 42 together throughout a complete revolution at the end of which time the rear end of the high portion 138 of the cam disk 137 is in position to engage the head 122 of the pin 119 and withdraw the pin from locking position, the pin riding upon the outer face of the collar 112 throughout the last half revolution of the sleeve 42 and then entering the aperture 117 in which the pin normally rests. In this operation the pin setter frame is in substantially continuous action throughout both revolutions. It ascends with the standing pins while the sweeper is moving rearwardly to sweep the alley and descends to replace them while the sweeper is moving forwardly back to normal position, thereby effecting a material saving in the time required for the removal of deadwood.

As has already been described, the driving rod 54 of the pin setter frame is normally engaged in the lower end of the slot 53 of the bell-crank lever 47. This is its position during the removal of deadwood in which it imparts the short travels of the pin setter frame. When, however, a new set is to be made and the longer travel of the frame required the end of the driving rod 54 connected with the bell-crank is raised by the first action of the control for the sweeper which, as has been stated, precedes in action the pin setter frame and its control. A rod 151 (Figs. 1, 2, 3) is mounted in a suitable bearing 152 on the forward arm 40' of the bracket member 40. This rod is bent at its upper end to provide a lifting arm 153 and is fastened to the vertically reciprocating driving rod 83 which actuates the sweeper by a bolt 154 passing through a slot 154' in the lower end of the rod 151. A pin 156 projects outwardly above the arm 153 from the driving rod 54 when the parts are in normal position, the initial movement of the rod 83 serving to lift the end of the rod 54, which is connected with the bell-crank from the lower end (deadwood position) to the upper end (new set position) of the slot, which movement is completed as the eccentric 44 is brought into operation to lower the pin setter frame by moving the bell-crank 46 about its pivotal axis. A spring 155 fastened at one end to the rod 151 and at the other to the driving rod 83 is provided to reduce the shock of the engagement between the pin 156 and the arm 153 of the rod. As soon as the bell-crank leaves its normal position the hook 57 engages beneath the pin 55 and the rod 54 is locked in upper position until the bell-crank returns again to normal position and the stops 63, 64 reëngage to release the pin 55 and permit the rod to drop by gravity to the lower end of the slot. The rod 151 can only operate when the parts are in normal position as it will be readily apparent that this rod will not interfere with the travel of the pin setter frame during the removal of deadwood for when the rod 151 starts upwardly during the movement of the sweeper in this operation the bell-crank is rearwardly of its normal position so that the pin 156 is not in position to be engaged by the lifting arm 153 of the rod.

The rack 83' (Fig. 1) on the rod 83 is held in engagement with the pinion 85 by a cross piece 150 of the main frame just back of this rod at the height of the pinion 85 and the rack 56 of the driving rod 54 is maintained in accurate operative engagement with the pinion 35, when the driving rod is operating in either of the two positions described, by a movable saddle 157 (Figs. 2 and 3) which consists in the present instance of two T-shaped rocker arms 158 loosely journaled at their inner ends on the shaft 33 and connected at their outer ends by rollers 159 which bear upon the upper surface of the rod 54. A spring 161 fastened at one end at 162 to the saddle and at the other to a pin 163 on the forward arm 40' of bracket member 40 pulls the saddle against the rod 54 and holds the rod against the pinion 35.

The pins are conducted from the alley pit to the setter frame and the balls returned to player's position by continuously operating mechanism which will be now described. The alley pit 164 (Fig. 1) is provided with an inclined reciprocating bottom 165 which delivers the pins through an aperture 166' in the rear wall 166 of the pit. In the present instance this bottom is constructed of a main member 167 which slopes downwardly toward the rear wall of the pit and terminates at the lower edge of the aperture 166'. Upon each side of the main member 167 is a side member 168 which slopes from its side of the alley toward the center of the main member 167. The side members 168 converge toward the aperture 166' in the rear wall and adjacent this aperture are spaced apart a distance substantially equal to its width. The reciprocating bottom 165 is supported at each side by a pair of links 169 fastened at their upper ends at 170 to the "kickbacks" and at their lower ends at 171 to the sides of the main member 167. The reciprocating bottom 165 is swung backward and forward about these points as centers by a continuously operating driving mechanism generally designated as 172. This mechanism comprises a gear 173 meshing with one of the chains 174 forming a part of the elevating conveyer, to be later described, which moves across the rear of the alley pit and receives the pins and balls as they are delivered through the aperture 166'. A beveled pinion 175 is connected by a shaft 176 with the gear 173 and rotates with this gear. This pinion produces a continuous rotation in a crank disk 177 upon which is rigidly fixed a companion pinion meshing with the pinion 175. A crank pin 178 of the disk is connected by a link 179 with an arm 180 extending downwardly beneath and fastened to the main member 167 of the pit bottom 165. The rotation of the crank disk through the pinions 175 and gear 173, therefore, moves the bottom of the pit back and forth about the centers 170. In order that the movement of the pins across the bottom of the alley pit may be accelerated the points 170, about which the links 169 oscillate, are positioned forwardly of the points 171 a sufficient distance to maintain each point 171 always rearwardly of its companion point 170, so that the movements of the reciprocating bottom toward the front of the pin setting machine cause the bottom to fall away from the pins imparting a creeping movement to the pins in addition to their ordinary rolling movement down the inclined pit bottom. The pins and balls, as they are delivered through the recess 166, fall upon the vertically movable conveyer which carries the pins singly upwardly and deposits them in a chute to be delivered to an assembly mechanism and which delivers the balls to the return track.

The conveyer is driven continuously by the main power shaft 39 which extends rearwardly of the pit through bearings 184 supported from the shelf 38 at 185 and from the rear wall 186 of the casing of the conveyer at 187. Upon the shaft 39 are sprocket wheels 188 over which the chains 174 of the conveyer travel in meshing engagement. As the pins and balls are moved through the aperture 166' in the rear wall of the pit they fall into the conveyer and are carried singly upwardly against a side wall 189 of the conveyer casing on the side of upper travel of the conveyer by conveyer blades or flights 191 secured at their ends to the chains 174. In this wall above the ball return track is provided an opening 196 (Figs. 1, 8, 9) of sufficient size to permit the balls to pass out of the casing onto the return track. This opening is normally closed by a pair of swinging doors 197. The doors 197 are hinged along their outer edges at 198 and are normally retained in closed position by a pair of springs 199. These springs are arranged so that as the doors open little additional tension is produced in the springs, thereby enabling the balls, as they roll through, to open the door under a substantially even force. Each spring 199 is fastened at one end to a pin 201 secured on the outer surface of the wall 195 beneath the doors and adjacent their line of junction and at its other end to the outer end of a pin 202 extending outwardly from adjacent the rear edge of each door at an angle to a point beyond the hinge 198 so that as the door opens the spring will not be appreciably elongated, its moving end swinging nearly in the arc of a circle about its fixed end. The springs 199 are of sufficient strength to prevent pins passing the doors from opening them but are incapable of resisting the pressure exerted by a ball carried upon a flight of the carrier so that the ball opens the doors and passes out.

The pins are carried by the flights 191 to the top of the wall 189 of the casing over which they are dumped into a chute 203, means being provided, which form no part of the present invention, for arranging the pins as they leave the conveyer with their head ends toward the rear of the pin setting machine. The pins are thus delivered singly to the chute 203 down which they slide and from which they are removed onto an assembly shelf 204 (Figs. 10, 11, 12) by a mechanism to be now described. A leaf 205 is hinged at 206 at the lower end of the chute. The lower end of the leaf 205 is normally held in elevated position by a spring 207 embracing a rod 208, the lower end of which is connected with the lower end of the leaf 205 by a flexible metallic strip 209. The rod 208 passes through a bearing 211 mounted on the main frame and the spring 207 presses against this bearing and against a collar 212 fastened upon the rod. A conveyer 213 having a plurality of outwardly extending blades 214 moves across the assembly shelf and also across the lower end of the chute. The assembly shelf is of sufficient length to permit ten pins to be collected thereon and the blades on the conveyer are spaced apart an appropriate distance to permit a pin to lie between each pair of adjacent blades.

The conveyer is trained over a pair of sprocket wheels 215 mounted on the main frame on opposite sides of the machine on supports 215' only the one wheel 215 which moves the conveyer ahead one step as each pin arrives at the lower end of the chute being shown. As the conveyer is advanced each step the pin which has just arrived at the bottom of the chute is moved onto the assembly shelf and each pin already carried by the shelf is advanced one step forward. The sprocket wheel 215 receives its motion from a gear 216 mounted upon the main power shaft 39. The movement imparted by the gear 216 to the sprocket wheel 215 is intermittent and is controlled by the pins themselves as they arrive at the lower end of the chute 203. The sprocket wheel 215 is rigidly mounted upon a shaft 217 loosely journaled in the support 215' and having fixed thereon a ratchet wheel 218. An arm 219 is mounted loosely on the shaft 217 and carries a pawl 221 adapted to engage the teeth of the ratchet wheel when it is desired to advance the conveyer 213. The arm is given a continuous oscillatory movement by a crank disk 222 secured to a pinion 223 mounted in a bracket 220 on the main frame 24 and meshing with the gear 216 and connected with the arm 219 by a link 224. The pawl 221 is normally held in inoperative position by a flexible arm 225 fixed to the arm 219 and provided with a pair of notches 226 and 226', the rear end of the pawl normally engaging in the lower notch 226 so that the pawl rides free of the ratchet 218 as the arm 219 oscillates. The upper end 227 of the rod 208 is bent to extend over the pawl when the arm 219 carries it to rearmost position. When a pin slides down the chute and rests upon the leaf 205 the weight of the pin pulls the rod downwardly against the force of the spring 207 and disposes the end 227 of the rod 208 in position to engage the pawl and move it downwardly into engagement with one of the teeth of the ratchet 218, lifting the rear end of the pawl out of engagement with the lower notch 226 and into engagement with the upper notch 226'. The pawl immediately engages behind the nearest ratchet tooth and imparts to the sprocket wheel 215 an angular advance equal to the throw of the arm 219 which moves the pin resting in the lower end of the chute onto the shelf and advances the pins already assembled in the manner described. The rear movement of the arm 219 causes the pawl to be lifted through contact with the next succeeding tooth and be engaged with the lower notch 226 in position to ride free of the ratchet wheel until the next pin arrives at the bottom of the chute and again actuates the rod 208.

The shelf 204 extends clear across the machine and is provided at the ends of its rear edge with downwardly depending brackets 231 which pivot about fixed studs 232 secured in the main frame 24 of the machine. The shelf is normally supported in slightly inclined position, as shown in Fig. 12, being held in this position by a pin 233 (Fig. 11) provided at the center in the front edge of the shelf beneath which engages the hooked arm 234 of a lever 235 fulcrumed at 236 upon the outer face of an abutment 237 which prevents certain of the pins, as will be later described, from sliding from the shelf while the shelf is in normal position.

When the pins leave the shelf they are carried by a plurality of chutes 238 to a stationary frame located above the pin setter frame in which they are disposed in accordance with their arrangement upon the alley bed. This frame is only shown generally on the drawings at 239 (Fig. 1) and which will not be particularly described as it forms no part of the present invention. In order that the chutes 238 may all be given sufficient inclination to cause the pins to be delivered rapidly from the assembly shelf to the stationary frame, I have elevated the upper ends of the chutes which are to deliver the pins to be set up in the first two rows upon the alley bed above the upper ends of the chutes delivering the pins to be set up in the two rear rows. Opposite the upper ends of these elevated chutes recesses 241 are cut through the abutment 237, through which, when the shelf is released, the pins slide into the chute. Each of these recesses is normally closed by a plate 242 (Figs. 12, 13) extending upwardly from the front edge of the assembly shelf opposite the recesses and having arms 242' extending under and fastened beneath the shelf. The shelf is cut away back of each recess at 243 and this cut-away portion is replaced by a stationary support 244 upon which the large end of the pin rests when the shelf is in normal position. This stationary support 244 is mounted upon the upper end of an arm 245 fastened at 246 on the main frame 24 beneath the aperture so that when the shelf is tilted the plate 242 moves with it and the support 244 retains the pin in the slightly inclined position it occupied on the shelf during the initial movement of the shelf, the large end of the pin resting stationary on the support 244 and the small end upon the upper edge of the shelf. The pins which are to be set up in the first two rows are held in this manner substantially immovable until the top of the plates 242 pass beneath the bottom of the chutes 238 having the elevated ends and beneath the supports 244, as best seen in Fig. 12, at which time the pins slide across the tops of the plates 242 in the chutes.

The shelf is prevented from tilting until ten pins have been assembled thereon at which time the hooked arm 234 of the lever 235 is disengaged from the pin 233. This is accomplished by a mechanism (Fig. 11) positively operated by the ratchet wheel 218 and occurs at every tenth actuation of this ratchet wheel. A pinion 251 is fixed upon the shaft 217 and rotates with the ratchet wheel 218 and sprocket wheel 215. This pinion is in mesh with a gear 252 mounted upon a stub shaft 253 supported by an arm 253' from the support 215'. The teeth upon the gear and the teeth upon the pinion are in proper ratio to impart a complete revolution to the gear for every ten actuations of the conveyer. Upon the gear is an outwardly extending pin 254 which at a predetermined point in the rotation of the gear is adapted to engage one arm 255' of a lever 255 pivoted upon the abutment 237 at 256. The other arm 257 of this lever is connected by a link 258 with the lever 235, the levers and links being so arranged that when the pin 254 engages the arm 255' of the lever 255 the hook arm 234 of the lever 235 will be moved toward the right, viewing Fig. 11, to disengage this arm from the pin 233 and to permit the shelf to drop by gravity to discharge the pins. A spring 259 (Fig. 12) secured at one end to a bracket 261 extending outwardly from the rear edge of the shelf and at the other end to a bracket 262 secured upon the main frame 24 returns the shelf to normal position after a set of pins has been delivered to the chutes 238. This spring is of sufficient strength to lift the shelf to normal position when no pins are resting on it but is not strong enough to support the shelf in normal position when it is carrying a charge of pins. When the shelf returns to normal position under the force of the spring 259 the hook arm 234 of the lever 235 reengages the pin 233. A spring 263 fastened at one end 264 to the abutment 237 and at the other end to the hook arm 234 of the lever 235 pulls the lever toward the left, viewing Fig. 11, into engagement with a stop 265 on the abutment. The lower face of the hook arm is inclined at 266 and as the shelf returns to normal position the pin 233 rides across this face and moves the arm temporarily toward the right out of its way to permit it to pass.

As a pin may arrive at the lower end of the chute while the shelf itself is depositing a set of pins in the chutes 238 I provide means for sustaining this pin as it is removed by the conveyer 213 (Figs. 10, 11) from the lower end of the chute until the assembly shelf is again in normal position. This means comprises a leaf 271 which slides transversely of the lower end of the chute and is adapted to be moved out over the tilted shelf. The leaf 271 moves in a groove 272 in the lower end of the chute and is fastened at its outer end to the end of a lever 273 pivoted at 274 in a bracket 275 secured upon the main frame of the pin setting machine above the shelf. Movement is imparted to the lever 273 by a bell-crank 276 mounted in a bearing 277 above the shelf. One arm of this bell-crank 278 is positioned to be engaged by the pin 254 immediately after the pin engages the end 255' of the lever 255. The other arm of the bell-crank 279 extends downwardly and is connected by a link 281 with the lever 273, so that downward movement of the arm 278 of the bell-crank will pull the lever 273 toward the chute and move the leaf 271 out beyond the chute in position to sustain the pin until the assembly shelf returns to normal position. The lever 273 is normally pulled from the chute by a spring 282 connected at one end to a bracket 220 and at the other end to an ear 283 extending upwardly from the arm 278 of the bell crank excessive outward movement of the lever 273 being prevented by a stop 284 fixed in the abutment 237 in position to engage the arm 279 of the bell-crank. The leaf 271 is maintained in operative position while the pin 254 is engaged with the arm 278 of the bell-crank which will be found to be longer than is actually required as the assembly shelf 204 deposits the pins rapidly and only momentary support for a pin received while the shelf is down is necessary.

The distributing frame is secured just above and slightly rearwardly of the pin setter frame when the latter is in upper or normal position and the pins are automatically delivered from the distributing frame to the pin setter frame as soon as the pin setter frame is ready for their reception. Twenty-nine pins are preferably provided. This permits ten to rest in the pin setter frame, ten in the distributing frame and nine on the assembly shelf. As soon as the new set button is pressed by the player the setter descends to deposit the ten pins carried thereby and returns empty to its normal position. As soon as it is in its upper position the set of pins carried by the distributing frame are dropped into place in the pin setter frame. The first pin of the set placed on the alley bed to arrive on the shelf completes the set there and this set immediately slides down into the distributing frame. The other nine pins of the first set are delivered to the shelf and the pins are arranged once more with a full set in the pin setter frame, a full set in the distributing frame and nine on the shelf. The mechanism for shifting the pins from the distributing frame to the pin setter frame is no part of my present invention and description thereof is thought unnecessary. This mechanism receives its power from the main power shaft 39 through the rod 291 (Fig. 3) which is attached at its upper end to an eccentric collar 292 of an eccentric 293 imparting to the rod a continuous vertical reciprocation which through suitable devices, as for instance those shown in my earlier application Serial No. 788,410, may intermittently impart a horizontal reciprocation to proper parts of the distributing frame to release the pins.

The pin setter frame (Figs. 1, 14, 15) consists in a framework formed of eight longitudinally extending bars 295 rigidly connected at their rear ends to a transversely extending bar 296 and with each other by shorter transverse bars 297. The adjacent bars 295 are spaced apart an appropriate distance to permit the pins to fit easily between adjacent pairs and a bar 297 is positioned in front of each stationary pin guide which will be later described. The two center bars 295 are longer than the others as they receive between themselves the pin to be set up at the forward apex of the triangular arrangement of the spots on the alley bed and the other bars vary in length in accordance with the spot positions of the pins which they receive. A guide formed in the present instance of two inclined blocks 298 is positioned between and fastened to the bars 295 just forwardly of the position assumed by each pin when lying in the pin setter frame and the bars 297 are arranged in front of these guides. These guides incline slightly rearwardly and guide the pins as they slide from the distributing frame to the pin setter frame into position. The bars 295, 296, 297 and the guides 298 are preferably constructed of wood although it will be apparent that any desired material may be used.

The standing pins are lifted above the alley bed during the deadwood operation by ten magnets 301 which are adapted to attract small armatures 301' one of which is provided for the purpose in the top of each pin 300. The magnets 301 are secured to a metal sheet or plate 299 which is carried by and beneath the pin setter frame. These magnets are rigidly fastened upon the under side of the plate and they are arranged directly above the spots on the alley bed when the frame is in upper or normal position. When the pins slide into the pin setter frame they rest upon the sheet 299 and to prevent injury to the magnets and to deaden the sound of the operation of the machine a buffer 302 is placed behind each magnet and between the pin and plate 299. The small ends of the pins are held in slightly raised position by a plurality of transversely disposed iron rods 303 which are fastened at their ends to arms 304 of levers 305 pivoted at 306 beneath the upper surface of the bars 295. The two arms of each of these levers are disposed angularly with respect to each other and are fastened at their angular intersection 307 to longitudinally extending links 308 so that movement of the links 308 forwardly will lift the rods 303 and consequently lift the pins into vertical position. A single rod 303 extends beneath the heads of all the pins forming the fourth or rearmost row and a lever 305 preferably connects this rod with a link 308, so that all must move in unison. Movement is imparted to the organization of levers, links, and rods just described by a curved lever 309 pivoted to the rear end of one of the links 308 intermediate its ends at 308', and at its ends 309' to the inner face of the central bar 295 and to an arm 310' of a bell crank 310 which is pivoted at 311 in a bracket extending rearwardly from the transverse bar 296 of the frame. A device for automatically moving the bell-crank about its pivot when the frame nears the alley bed to right the pins and deposit them upon the spots is provided, but as this device forms no part of my present invention I do not show or describe it. I prefer, however, to employ the device disclosed in my earlier application, Serial No. 788,410.

Ten circular apertures of diameter somewhat greater than the greatest diameter of the pins are provided in the plate 299 through which apertures the pins are adapted to be deposited upon the spots. These apertures are arranged in accordance with the spots on the alley bed and each is located just in front of a pin lifting magnet 301 so that it is normally disposed forwardly of the pin resting upon the plate which is to pass through the aperture. When the pin setter frame nears the alley bed preparatory to depositing pins thereon the plate and the magnets carried thereby are moved rearwardly with respect to the frame to bring the apertures into position to permit the pins to be placed upon the spots. This movement is accomplished by a link 317 secured at one end to a plate at 317' and at the other end to the end of an arm 318 secured upon the bell crank 310 so that the movement of the bell-crank in righting the pins, as has been earlier described, will also move the plate 299, bringing the apertures 313 into proper position. In order that the plate may move freely with respect to the pin setter frame it is supported from the pin setter frame (Figs. 1, 14) by upwardly extending arms 314 carrying rollers 315 at their upper ends which are adapted to roll transversely on tracks 316 carried upon the outer faces of the bars 295.

In Fig. 19 the electric wiring switches and various mechanical devices provided to complete and interrupt the various circuits provided to control the parts of the pin setting machine embodying my present invention are diagrammatically disclosed. In this figure 321 indicates the positive element of the source of electrical energy and 322 the negative element. The electrical control of the pin setting machine comprises four separate circuits, the first for energizing the magnets 99 and 123 for making a new set, the second for energizing the magnets 99 and 124 to control the movement of the frame and sweeper during the removal of deadwood, the third for supplying electrical energy to the pin-lifting magnets 301 throughout a proper interval during the removal of deadwood and the fourth for energizing a magnet 323 which controls the delivery of the pins from the distributing frame to the pin setter frame. The two last mentioned circuits are automatic in their operation and the two former are controlled by the pressing of a button or the closing of a switch at the player's end of the alley.

The circuit for making a new set consists of a wire 324 leading from the positive element 321 to the magnet 99, a wire 325 leading from the magnet 99 to a pair of terminals $a$ provided in a block 326 (Figs. 2, 3, 5) between which moves a terminal $b$ fastened on the saddle 125 carrying the magnet 123, a wire 327 leading from the terminal $b$ to the magnet 123, a wire 328 leading from the magnet 123 to a terminal $c$ also carried by the saddle 125 in position to contact with a pair of terminals $d$ mounted in the block 326, a wire 329 leading from the terminals $d$ to a similar pair of terminals $e$ mounted in a block 331 (Figs. 2, 3), a terminal $f$ carried on the saddle 125 of the magnet 124, a wire 332 connecting the terminal $f$ with a similar terminal $g$ also carried on the saddle of the magnet 124, a pair of terminals $h$ carried in the block 331, and a wire 333 leading from the terminals $h$ to one terminal of the new set button 334; from the other terminal of the new set button 334 a wire 335 leading to a yielding terminal 336 which is mounted on the distributing frame or on some other fixed part of the pin setting machine in position to contact with a terminal 337 carried by the pin setter frame when the pin setter frame is in upper or normal position; from the terminal 337 a wire 338 leading to a fixed terminal 339 mounted beneath one of the pins in the pin setter frame in position to contact with a yielding terminal 341 when the latter terminal is depressed by the weight of a pin resting thereon; from the terminal 341 a wire 342 leading to a terminal 343 mounted with the terminal 337 on the pin setter frame in position to contact with a yielding terminal 344 carried by the distributing or some other fixed part of the pin setting machine when the pin setter frame is in upper or normal position, and a wire 345 leading from the terminal 344 to the negative element 322.

The circuit for controlling the removal of deadwood comprises the wire 324, magnet 99, wire 325, terminals $a$ and $b$, a wire 346 leading from the terminal $b$ to a terminal $i$ mounted with the terminals $b$ and $c$ on the saddle 125 in position to contact with another pair of terminals $j$ carried by the block 326, a wire 347 leading from the terminals $j$ to a pair of terminals $k$ mounted on the block 331 in position to contact with a terminal $l$ on the saddle of the magnet 124, a wire 348 leading from the terminal $l$ to the magnet 124, a wire 349 leading from the magnet 124 to a terminal $m$ carried by the saddle with the terminals $f$, $g$ and $l$ in position to contact with a pair of terminals $n$ carried in the block 323, a wire 351 leading from the terminals $n$ to one terminal of the deadwood switch or button 352, and a wire 353 communicating with the wire 335 and through the wire 335 to the negative element along the same circuit, followed from this point by the current in controlling the action of the pin setting machine during the making of a new set.

The two circuits just described are arranged not only to energize the magnets 123 and 124 at appropriate instances to effect the new set or deadwood operations but also to prevent untimely actuation of the pin setting machine, preventing the starting of one operation until a previous one is completed. During either operation one of the eccentrics 81 and 44 is always moving and out of normal position. A part of each circuit is carried by each eccentric so that if either eccentric be out of normal position both are interrupted. In the circuit controlling the new set operation the current must pass through the magnet 123, which can only occur when the terminals $b$ and $c$ are in contact respectively with the terminals $a$ and $d$, and must pass also through the wire 332 connecting the terminals $f$ and $g$ carried by the sweeper-directing eccentric, which can only occur when these terminals are in contact respectively with the terminals $e$ and $h$, so that if either eccentric be out of normal position, so that contact is broken between either of these two sets of terminals, the new set operation can not be started. In the circuit controlling the removal of deadwood the current must pass through the wire 346, which is carried by the setter-directing eccentric which can only occur when the terminals $b$ and $i$ on the eccentric are in contact with the terminals $a$ and $j$ on the fixed part of the machine and this circuit must also pass through the magnet 124 which is impossible unless the terminals $l$ and $m$ on the sweeper-directing eccentric are in contact with the terminals $k$ and $n$ on the fixed part of the machine, interruption of the circuit between either of these two sets of terminals preventing the closing of the deadwood circuit. The machine must, therefore, be at rest before either circuit may be completed and the operation started. Moreover, neither of these circuits may be closed when the pin setter frame is out of upper or normal position as in such an event the terminals 337 and 343 mounted on the distributing frame are out of contact when the terminals 336 and 344 carried by the machine in position to contact with the terminals 337 and 343 when the pin setter frame is in upper or normal position. A further interruption of the two circuits occurs if the pin setter frame be empty and the flexible terminal 341 be not held in contact with the terminal 339. This last interruption is believed advantageous not only in making a new set as obviously the frame must contain pins in this operation but also in the removal of deadwood for when the frame is lowered empty a charge of pins might be dropped from the distributing frame into it while it is lifting the standing pins, the shock of the set falling into the frame possibly being sufficiently great to jar loose the pins supported above the alley bed while the alley is being swept.

The magnets 301, which lift the standing pins during the removal of deadwood are energized, as has been stated, by a separate circuit. Starting from the positive element of the source of electrical supply 321, a wire 354 leads through a blow-out 355 to one terminal 356 of a switch which mechanically closes during the second half of the first and the first half of the second revolution of the shaft 39 each time the sleeve 42 is locked to the shaft by the clutch 43. The switch is mechanically closed (Figs. 2, 18) by a lever 357 pivoted at 358 on the bracket 40 and having one arm 359 extending over the switch arm 356 and the other arm 361 disposed adjacent a face of the disk 91. Upon this face of the disk is provided a cam block 362, the forward end of which 363 engages under the arm 361 of the lever 357 raising the arm and holding it elevated until the disk has rotated through an angle of 180°. During the time that the end of the arm 361 is riding upon the block 362 the switch arm 356 is depressed and contact is established between it and its companion terminal 364. It will be noted that the forward end 303 of the cam block is located 90° or one-quarter revolution of the disk rearwardly of the recess 95, so that when the disk starts to operate the switch terminals or arms 356 are not brought in contact during the first one-quarter revolution of the disk or the first half revolution of the shaft 39.

From the terminal 364 a wire 365 leads to one contact 366 of a switch mounted upon the main frame (Figs. 16, 17) beneath the brackets 34 supporting the shaft 33. One terminal 366 of this switch is mounted upon the frame itself and the other terminal 367 is carried by the saddle 157 which holds the rod in engagement with the pinion 35. The two terminals contact when the rod 54 is in its deadwood position with the pin 55 engaging in the lower end of the slot 53 and are moved apart when the rod 54 is lifted to bring the pin 55 into the upper end of the slot for making a new set. This switch prevents the energization of the pin lifting magnets during the making of a new set and affects thereby an economy of electrical energy. From the terminal 367 the current flows through a wire 368 to the pin lifting magnets 301. From these magnets it passes through a wire 369 to the negative element 372 of the source of energy.

The fourth circuit, which controls the action of the means for releasing the pins carried in the distributing frame consists of a wire 371 leading from the positive element 321 of the source of energy to a switch 372 which is adapted to be closed by the weight of pins resting in the distributing frame, a wire 373 leading from the switch 372 to the magnet 323, a wire 374 leading from the magnet 323 to a flexible terminal 375 carried by the distributing frame in position to contact with a terminal 376 mounted upon the pin setter frame when the latter is in upper position, a wire 377 leading from the terminal 376 to a fixed terminal 378 positioned adjacent the flexible terminal 341 which, when no pin is resting thereon, moves out of contact through the force of its resiliency with the terminal 339 in the circuits controlling the operations of new set and deadwood into contact with the terminal 378; from the terminal 341 the circuit continues through the wire 342, terminal 343 carried by the pin setter frame, terminal 344 carried by the distributing frame and wire 345 connecting the terminal 344 with the negative element 322 of the source of supply. It is apparent that the last mentioned circuit may not be closed unless a set of pins rests in the distributing frame and the pin setter frame is empty and in upper position.

It will be obvious that numerous changes may be made in the form, construction and arrangement of the parts of the pin setting machine herein described without departing from the spirit and scope of my invention or sacrificing any of its material advantages, the various devices and mechanisms disclosed being merely practical and at present preferred embodiments thereof.

I claim:

1. In a pin setting machine for a bowling alley, the combination of a pin setter, means normally suspended above the plane of the tops of the pins on the alley bed for clearing the alley preparatory to the setting operation, and means for bringing the setter into operation during the movement of the clearing means.

2. In a pin setting machine for a bowling alley, the combination of a sweeper normally suspended above the plane of the tops of the pins on the alley bed and adapted to clear the alley bed, a pin setter adapted to place a set of pins in position upon the alley bed, and means for moving said sweeper downwardly and rearwardly over the alley bed and back to normal position and for moving said setter into position adjacent the alley bed to deposit a set of pins, said means causing the setter to move into position adjacent the alley bed while the sweeper is returning to normal position after clearing the alley.

3. In a pin setting machine for a bowling alley, the combination of a sweeper normally suspended above the plane of the tops of the pins on the alley bed and adapted to clear the alley bed, said sweeper having a sweeping movement and a return movement, and a pin setter for placing a set of pins in position on the alley bed and having a movement into position to deposit the pins and a return movement, the movement of the setter into position to deposit the pins occurring during the return movement of the sweeper.

4. In a pin setting machine for a bowling alley, the combination of continuously operating means for temporarily lifting pins standing on the alley bed, and means for clearing the alley of fallen pins while the standing pins are being lifted.

5. In a pin setting machine for a bowling alley, the combination of movable means for lifting the standing pins from the alley bed and replacing them again upon the alley bed, and a sweeper for clearing the alley bed of fallen pins while the standing pins are lifted, said sweeper clearing the alley of fallen pins during the operation of said lifting means.

6. In a pin setting machine for a bowling alley, the combination of movable means for lifting the standing pins from the alley bed and replacing them again upon the alley bed, and a sweeper for clearing the alley bed of fallen pins while the standing pins are being lifted, said sweeper returning to normal position after clearing the alley bed while said pins are being replaced.

7. In a pin setting machine for a bowling alley, the combination of means for temporarily lifting pins standing on the alley bed, said means having a lifting operation and a replacing operation, and a sweeper for clearing the alley while the standing pins are lifted, said sweeper sweeping the alley during the lifting operation of the lifting means and returning to normal position during its replacing operation.

8. In a pin setting machine for a bowling alley, the combination of a frame for picking up standing pins from the alley bed, said frame having four movements, the first into position to pick up the standing pins, the second away from the alley bed with the standing pins, the third back to the alley bed into position to replace the standing pins and the fourth back to normal position, a sweeper for clearing the alley bed of fallen pins while the standing pins are off the alley, and means moving said sweeper during the second and third movements of the frame.

9. In a pin setting machine for a bowling alley, the combination of a frame for picking up standing pins from the alley bed, said frame having four movements, the first into position to pick up standing pins, the second away from the alley with the standing pins, the third into position to replace the standing pins and the fourth back to normal position, and a sweeper having a sweeping movement and a return movement, said sweeping movement occurring during the second movement of the frame and said return movement occurring during the third movement of the frame.

10. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper; said means comprising a sweeper-directing cam, a setter-directing cam, and means for imparting a single revolution to each cam, the sweeper-directing cam a part revolution in advance of said setter-directing cam.

11. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper, said means comprising a shaft, a sweeper-directing cam and a setter-directing cam mounted on said shaft, means for imparting two revolutions to said shaft, and means for locking both said cams to the shaft during a complete revolution of the shaft, the setter-directing cam a part revolution behind the sweeper-directing cam.

12. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper, said means comprising a shaft, a sweeper-directing cam and a setter-directing cam mounted on said shaft and normally locked thereto, means for rotating said shaft, and means for unlocking said setter-directing cam during a part of the first revolution of the shaft.

13. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper, said means comprising a shaft, a sweeper-directing cam and a setter-directing cam mounted on said shaft and normally locked thereto, means for rotating said shaft, and means for unlocking said setter-directing cam during the first half revolution of the shaft.

14. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper, said means comprising a shaft, a sweeper-directing cam and a setter-directing cam mounted on said shaft and normally locked thereto, means for rotating said shaft, means for unlocking said setter directing cam during the first half revolution of the shaft, and means for unlocking said sweeper-directing cam at the end of a complete revolution of said shaft.

15. In a pin setting machine for a bowling alley, the combination of a pin setter adapted to deposit a set of pins in position upon the alley bed, a sweeper adapted to clear the alley prior to the action of said setter, and means for controlling and timing the operation of said setter and sweeper, said means comprising a shaft, a setter-directing cam, a sweeper-directing cam, means locking said cams to the shaft and electrically controlled means for unlocking said setter-directing cam.

16. In a pin setting machine for a bowling alley, the combination of a pin setter adapted to deposit a set of pins in position upon the alley bed, a sweeper adapted to clear the alley prior to the action of said setter, and means for controlling and timing the operation of said setter and sweeper, said means comprising a shaft, a setter-directing cam, a sweeper-directing cam, means locking said cams to the shaft, and mechanically controlled means for unlocking said cams.

17. In a pin setting machine for a bowling alley, the combination of a pin setter adapted to deposit a set of pins in position upon the alley bed, a sweeper adapted to clear the alley prior to the action of said setter, and means for controlling and timing the operation of said setter and sweeper, said means comprising a shaft, a setter-directing cam, a sweeper-directing cam, means locking said cams to the shaft and electrically controlled means for unlocking said setter-directing cam at one point in the operation of the machine and mechanically controlled means for unlocking said setter-directing cam at another stage of said operation.

18. In a pin setting machine for a bowling alley, the combination of a pin setter adapted to deposit a set of pins in position upon the alley bed, a sweeper adapted to clear the alley prior to the action of said setter, and means for controlling and timing the operation of said setter and sweeper, said means comprising a shaft, a setter-directing cam, a sweeper-directing cam, means locking said cams to the shaft and electrically controlled means for unlocking said setter-directing cam at a predetermined point in the operation of the machine, and mechanically controlled means for unlocking the sweeper directing cam at another point in said operation.

19. In a pin setting machine for a bowling alley, the combination of a pin setter adapted to deposit a set of pins in position upon the alley bed, a sweeper adapted to clear the alley bed prior to the action of said setter, and means for controlling and timing the actions of said setter and sweeper, said means comprising a shaft, a sweeper directing cam and a setter-directing cam mounted on said shaft and normally locked thereto, means for rotating said shaft, means for unlocking said setter-directing cam during the first half revolution of the shaft, and mechanical means for unlocking said sweeper-directing cam at the end of a complete revolution of said shaft.

20. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed and means for controlling and timing the operation of said frame and sweeper, said means comprising a frame-directing cam, a sweeper-directing cam, means for imparting to the frame-directing cam two revolutions and to the sweeper-directing cam one revolution.

21. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed, and means for controlling and timing the operation of said frame and sweeper, said means comprising a frame-directing cam, a sweeper-directing cam, means for imparting to the frame-directing cam two revolutions and to the sweeper-directing cam one revolution, the revolution of the sweeper-directing cam starting after a half revolution of the frame-directing cam has been completed.

22. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed, and means for controlling and timing the operation of said frame and sweeper, said means comprising a shaft, a frame-directing cam and a sweeper-directing cam normally locked on said shaft, means for imparting two revolutions to said shaft, and means for unlocking said sweeper-directing cam during a part of the first revolution of the shaft.

23. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed, and means for controlling and timing the operation of said frame and sweeper, said means comprising a shaft, a frame-directing cam and a sweeper directing cam normally locked on said shaft, means for imparting two revolutions to said shaft, and electrically controlled means for unlocking said sweeper-directing cam during a part of the first revolution of the shaft.

24. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed, and means for controlling and timing the operation of said frame and sweeper, said means comprising a shaft, a frame-directing cam and a sweeper-directing cam normally locked on said shaft, means for imparting two revolutions to said shaft, and means for unlocking the sweeper-directing cam during the first and last half revolutions of the shaft.

25. In a pin setting machine for a bowling alley, the combination of a movable frame adapted to lift pins standing upon the alley bed above the alley bed and return them to standing position upon the alley bed, a sweeper adapted to clear the alley bed after the standing pins have been raised above the alley bed, and means for controlling and timing the operation of said frame and sweeper, said means comprising a shaft, a frame-directing cam and a sweeper directing cam normally locked on said shaft, means for imparting two revolutions to said shaft, electrically controlled means for unlocking the sweeper-directing cam during the first half revolution of the shaft and mechanical means for unlocking the sweeper-directing cam during the last half revolution of the shaft.

26. In a pin setting machine for a bowling alley, the combination of a sweeper adapted to clear the alley bed and a pin setter adapted to deposit a set of pins upon the alley bed and to lift pins standing on the alley bed above the alley bed, and means for controlling and timing the action of said sweeper and setter, said means comprising a sweeper-directing cam, a setter-directing cam, means for imparting to the sweeper-directing cam a complete revolution and to the setter-directing cam a complete revolution one half revolution behind the sweeper-directing cam and for imparting two complete revolutions to the setter-directing cam and one complete revolution to the sweeper-directing cam one half revolution behind the setter-directing cam.

27. In a pin setting machine for a bowling alley, the combination of a sweeper adapted to clear the alley bed and a pin setter adapted to deposit a set of pins upon the alley bed and to lift pins standing on the alley bed above the alley bed, and means for controlling and timing the action of said sweeper and setter, said means comprising a shaft, a sweeper-directing cam and a setter-directing cam mounted on and normally locked to said shaft, means imparting two revolutions to the shaft, means for unlocking the setter-directing cam during a portion of the first revolution of the shaft, and means for unlocking the sweeper-directing cam during a portion of the first revolution of the shaft.

28. In a pin setting machine for a bowling alley, the combination of a sweeper adapted to clear the alley bed and a pin setter adapted to deposit a set of pins upon the alley bed and to lift pins standing on the alley bed above the alley bed, and means for controlling and timing the action of said sweeper and setter, said means comprising a shaft a sweeper-directing cam and a setter directing cam mounted on and normally locked to said shaft, means imparting two revolutions to the shaft, means for unlocking the setter-directing cam during the first and last half revolutions of the shaft and for unlocking the sweeper-directing cam during the last revolution of the shaft in one operation of the machine and for unlocking the sweeper-directing cam during the first and last half revolutions of the shaft in a second operation of the machine.

29. In a pin setting machine for a bowling alley, the combination of a vertically movable frame adapted to travel to adjacent the alley bed to deposit a set of pins in position upon the alley bed in one operation of the machine and adapted to travel adjacent the tops of the standing pins, once to pick up the standing pins and again to replace them upon the alley bed in another operation of the machine, and means for imparting said travels to said frame, said means comprising a pivotally mounted member, means for moving said member, a driving rod attached to said member, and means for automatically shifting the point of attachment of said rod and member toward and from the pivotal axis of said member to attain the lengths of travel desired.

30. In a pin setting machine for a bowling alley, the combination of a vertically movable frame adapted to travel to adjacent the alley bed to deposit a set of pins in position upon the alley bed in one operation of the machine and adapted to travel adjacent the tops of standing pins, once to pick up the standing pins and again to replace them upon the alley bed in another operation of the machine, and means for imparting said travels to said frame, said means comprising a pivotally mounted member, means for moving said member, a driving rod attached to said member, means for automatically shifting the point of attachment of said rod and member toward and from the pivotal axis of said member to attain the lengths of travel desired, and means for locking said rod in desired position.

31. In a pin setting machine for a bowling alley, the combination of a vertically movable frame adapted to travel to adjacent the alley bed to deposit a set of pins in position upon the alley bed in one operation of the machine and adapted to travel adjacent the tops of the standing pins, once to pick up the standing pins and again to replace them upon the alley bed in another operation of the machine, and means for imparting said travels to said frame, said means comprising a bell-crank, means for oscillating said bell-crank, a driving rod connected to said bell-crank and adapted to be disposed at different distances from the pivotal axis of said bell-crank corresponding to the length of travel desired, and means controllable from the player's end of the alley for automatically shifting the point of attachment of said rod and bell-crank.

32. In a pin setting machine for a bowling alley, the combination of a vertically movable frame adapted to travel to adjacent the alley bed to deposit a set of pins in position upon the alley bed in one operation of the machine and adapted to travel adjacent the tops of the standing pins, once to pick up the standing pins and again to replace them upon the alley bed, in another operation of the machine, and means for imparting said travels to said frame, said means comprising a vertically disposed bell-crank having an arcuate slot extending longitudinally thereof, a driving rod pivoted in said slot, and means for locking said rod in either end of said slot.

33. In a pin setting machine for a bowling alley, the combination of a vertically movable frame adapted to travel to adjacent the alley bed to deposit a set of pins in position upon the alley bed in one operation of the machine and adapted to travel adjacent the tops of the standing pins, once to pick up the standing pins and again to replace them upon the alley bed in another operation of the machine, and means for imparting said travels to said frame, said means comprising a vertically disposed bell-crank having an arcuate slot extending longitudinally thereof, and a driving rod pivoted in said slot, said rod being normally disposed at the lower end of said slot, and means for automatically lifting the rod to the upper end of said slot.

34. In a pin setting machine for a bowling alley, the combination of a vertically movable frame adapted to be lowered adjacent the alley bed to deposit a set of pins in position upon the alley bed in one operation of the machine and adapted to travel adjacent the tops of the standing pins, once to pick up the standing pins and again to replace them upon the alley bed in another operation of the machine, and a sweeper adapted to clear the alley bed prior to the action of the frame in the first mentioned operation and while the pins are lifted in the second mentioned operation, and means for controlling and timing the action of said frame and sweeper, said means comprising a vertically reciprocating rod for actuating the sweeper, a pinion for actuating the frame, a pivotally mounted arm having a longitudinally disposed slot, a driving rod normally secured at an end in the lower end of said slot and provided with a rack engaging said pinion at its other end, and means carried by the vertically reciprocating rod actuating the sweeper for lifting the driving rod from the lower end to the upper end of the slot in said pivotally mounted arm.

35. In a pin setting machine for a bowling alley, the combination of a vertically movable frame adapted to be lowered adjacent the alley bed to deposit a set of pins in position upon the alley bed in one operation of the machine and adapted to travel adjacent the tops of the standing pins, once to pick up the standing pins and again to replace them upon the alley bed in another operation of the machine, a sweeper adapted to clear the alley bed prior to the action of the frame in the first mentioned operation and while the pins are lifted in the second mentioned operation, and means for controlling and timing the action of said frame and sweeper, said means comprising a vertically reciprocating rod for actuating the sweeper, a pinion for actuating the frame, a pivotally mounted arm having a longitudinally disposed slot, a driving rod normally secured at an end in the lower end of said slot and provided with a rack engaging said pinion at its other end, and means carried by the vertically reciprocating rod actuating the sweeper for lifting the driving rod from the lower end to the upper end of the slot in said pivotally mounted arm, said means being operative only during the initial step in an operation of the machine.

36. In a pin setting machine for a bowling alley, the combination of a vertically movable frame adapted to be lowered adjacent the alley bed to deposit a set of pins in position upon the alley bed in one operation of the machine and adapted to travel adjacent the tops of the standing pins, once to pick up the standing pins and again to replace them upon the alley bed in another operation of the machine, and a sweeper adapted to clear the alley bed prior to the action of the frame in the first mentioned operation and while the pins are lifted in the second mentioned operation, and means for controlling and timing the action of said frame and sweeper, said means comprising a pinion adapted to lift and lower said frame, a reciprocatory rod having a rack at one end adapted to engage in said pinion, and means for retaining the rack in engagement with said pinion.

37. In a pin setting machine for a bowling alley, the combination of a vertically movable frame adapted to be lowered adjacent the alley bed in one operation of the machine and adapted to travel adjacent the tops of the standing pins once to pick up the standing pins and again to replace them upon the alley bed in another operation of the machine, a sweeper adapted to clear the alley bed prior to the action of the frame in the first mentioned operation and while the pins are lifted in the second mentioned operation, and means for controlling and timing the action of said frame and sweeper, said means comprising a shaft, a pinion rigidly mounted on said shaft, a reciprocating rod having a rack at one end engaging said pinion and a saddle loosely embracing the shaft at its ends and extending behind said rod for holding the rod in engagement with said pinion.

38. The combination of means for setting pins upon the alley bed of a bowling alley, and a rocking member located in the bottom of the alley pit to deliver pins from the alley pit into position to be delivered to the setting means.

39. The combination of means for setting pins upon the alley bed of a bowling alley, and a bowling alley having a reciprocating pit bottom for delivering pins from the alley pit into position to be delivered to the setting means.

40. The combination of means for setting pins upon the alley bed of a bowling alley, and a bowling alley having an inclined bottom in the alley pit, and means for reciprocating said bottom to deliver the pins from the alley pit into position to be delivered to said setting means.

41. The combination of means for setting pins upon the alley bed of a bowling alley, and a bowling alley having a pit bottom suspended in the alley pit, and means for reciprocating said pit bottom toward one side only of its points of suspension to deliver pins from the alley pit in position to be delivered to said setting means.

42. The combination of means for setting the pins on the alley bed of a bowling alley, an inclined reciprocable bottom in the alley pit and continuously rotating means for reciprocating said pit bottom to deliver pins from the alley pit into position to be delivered to said setting means.

43. In a pin setting machine for a bowling alley, the combination of means for setting the pins upon the alley bed, a continuously moving carrier for lifting the pins from the alley pit above the alley pit, a movable bottom in said alley pit, and means operable by said carrier for moving said bottom to deliver pins from the alley pit onto said conveyer.

44. In a pin setting machine for a bowling alley, the combination of means for setting the pins upon the alley bed, a carrier continuously moving in one direction, a reciprocatory bottom in the alley pit, and means operable by the carrier for reciprocating said pit bottom.

45. In a pin setting machine for a bowling alley, the combination of means for setting the pins upon the alley bed, a movable bottom in the alley pit, an elevating conveyer for lifting the pins above the alley pit, and a crank connected to said pit bottom and movable by said conveyer for reciprocating the pit bottom to deliver pins from the alley pit onto said carrier.

46. In a pin setting machine for a bowling alley, the combination of means for setting the pins, and means for conveying the pins from the alley pit to the setting means and for conveying the balls to the return track, said means comprising an endless carrier disposed in a vertical plane, a casing in which said carrier moves throughout a portion of its travel, a double door in said casing in position to be engaged by the balls and pins on the carrier, and a spring normally holding each door in closed position and preventing opening of the door when a pin passes thereby and permitting opening of the door when a ball engages therewith.

47. In a pin setting machine for a bowling alley, the combination of means for setting the pins, and means for conveying the pins from the alley pit to the setting means and for conveying the balls to the return track, said means comprising an endless carrier disposed in a vertical plane, a casing in which said carrier moves throughout a portion of its travel, a door in said casing adapted to open when a ball engages therewith and to remain closed when a pin passes thereby, and a spring normally retaining said door in closed position, said spring being arranged to exert a substantially even force while the door is opening and closing.

48. In a pin setting machine for a bowling alley, the combination of means for setting the pins, and means for conveying the pins from the alley pit to the setting means and for conveying the balls to the return track, said means comprising an endless carrier disposed in a vertical plane, a casing in which said carrier moves throughout a portion of its travel, a door in said casing adapted to open when a ball engages therewith and to remain closed when a pin passes thereby, and a spring secured at one end to the casing adjacent the free edge of the door when the latter is in closed position and fastened at its other end to an arm extending outwardly and rearwardly from the rear edge of said door.

49. In a pin setting machine for a bowling alley, the combination of means for setting the pins, and means for conveying the pins from the alley pit to the setting means, said conveying means comprising a vertically swinging shelf, means normally retaining the shelf in pin-receiving position, means for delivering the pins to said shelf, and means operable by the last mentioned means for releasing said retaining means when a full set of pins has been delivered on the shelf.

50. In a pin setting machine for a bowling alley, the combination of means for setting the pins, and means for conveying the pins from the alley pit to the setting means, said conveying means comprising a vertically swinging shelf, means normally retaining the shelf in pin-receiving position, means for delivering the pins to an end of said shelf, and means located adjacent the end of the shelf at which the pins are received for releasing the shelf when a full set of pins has been assembled thereon.

51. In a pin setting machine for a bowling alley, the combination of means for setting the pins, and means for conveying the pins from the alley pit to the setting means, said conveying means comprising a vertically swinging shelf, means normally retaining the shelf in pin-receiving position, means for delivering the pins to an end of the shelf, a conveyer and actuating mechanism for the same for moving the pins onto said shelf, and means operable by said mechanism for releasing the shelf after the conveyer has traveled a predetermined distance.

52. In a pin setting machine for a bowling alley, the combination of means for setting the pins, and means for conveying the pins from the alley pit to the setting means, said conveying means comprising a vertically swinging shelf, means normally retaining the shelf in pin-receiving position, a conveyer for delivering pins on the shelf, a sprocket wheel over which said conveyer travels, a trip mechanism connected to and moving with said sprocket, said trip mechanism being adapted to release the shelf every time a full set of pins has been assembled upon the shelf by said conveyer.

53. In a pin setting machine for a bowling alley, the combination of means for setting the pins, and means for conveying the pins from the alley pit to the setting means, said conveying means comprising a vertically swinging shelf, means normally retaining the shelf in pin-receiving position, a conveyer for delivering pins onto said shelf and having a plurality of flights each adapted to move a pin onto said shelf, means advancing said conveyer every time a pin is delivered, a trip mechanism for releasing said shelf, and means engaging said conveyer-advancing means for actuating said trip mechanism at every tenth advance of said conveyer.

54. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and to return to normal position, means for delivering pins to said shelf, and means for retaining a pin delivered while the shelf is tilting to discharge a set of pins.

55. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and to return to normal position, means for delivering pins to said shelf, and means for retaining a pin delivered while the shelf is tilting to discharge a set of pins and depositing it upon said shelf when the latter has returned to normal position.

56. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and to return to normal position, means for delivering pins to said shelf, a retaining shelf adapted to replace said vertically swinging shelf while said vertically swinging shelf is delivering pins, and means for moving said retaining shelf into position.

57. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and to return to normal position, means for delivering pins to said shelf, a trip mechanism for retaining said vertically swinging shelf when a desired number of pins have been collected thereon, a retaining shelf, means for moving said retaining shelf into position to hold a pin delivered when said vertically swinging shelf is released, and common means for controlling said trip mechanism and said means moving the retaining shelf.

58. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and to return to normal position, means for delivering pins to said shelf, a trip mechanism for retaining said vertically swinging shelf in pin receiving position adapted to release said shelf when a desired number of pins have been collected thereon, a retaining shelf, means for moving said retaining shelf into position to hold pins delivered when said vertically swinging shelf is released, and means for timing the actuation of said trip mechanism and the retaining shelf, the trip mechanism in advance of the retaining shelf.

59. In a pin setting machine for a bowling alley, the combination of means for setting the pins, and means for conveying the pins from the alley pit to said setting means, said conveying means comprising a vertically swinging shelf normally retained in pin-receiving position and adapted to drop momentarily to discharge pins assembled thereon and return to normal position, means for delivering pins on an end of said shelf, and a sliding shelf adapted to be projected above the pin-receiving end of said vertically swinging shelf while the latter is discharging pins to retain a pin delivered until the vertically swinging shelf returns to normal position.

60. In a pin setting machine for a bowling alley, the combination of means for setting the pins, and means for conveying the pins from the alley pit to said setting means, said conveying means comprising an inclined chute, means for depositing pins in said chute, an inclined assembly shelf, and means for moving the pins from the bottom of the chute onto said shelf.

61. In a pin setting machine for a bowling alley, the combination of means for setting the pins, and means for conveying the pins from the alley pit to said setting means, said conveying means comprising an inclined chute, means for depositing pins in said chute, an inclined assembly shelf, means for moving the pins from the bottom of the chute onto said shelf, and means for preventing the pins from sliding off the lower edge of said shelf when the shelf is in normal position.

62. In a pin setting machine for a bowling alley, the combination of means for setting the pins, and means for conveying the pins from the alley pit to said setting means, said conveying means comprising an inclined chute, means for depositing the pins in said chute, an assembly shelf disposed in the plane of said chute, and means for moving the pins from the bottom of the chute onto the shelf.

63. In a pin setting machine for a bowling alley, the combination of means for setting the pins, and means for conveying the pins from the alley pit to said setting means, said conveying means comprising an assembly shelf pivoted along an edge and normally held in pin-receiving position, an abutment at the other edge of said shelf, means for permitting the shelf to drop at predetermined intervals, and means for discharging a pin over the said abutment when said shelf drops.

64. In a pin setting machine for a bowling alley, the combination of means for setting the pins, and means for conveying the pins from the alley pit to said setting means, said conveying means comprising an assembly shelf pivoted along an edge and normally held in pin-receiving position, an immovable abutment, an abutment movable with said shelf, means permitting said shelf to drop at predetermined intervals, and means for discharging a pin disposed opposite the abutment movable with the shelf over said abutment.

65. In a pin setting machine for a bowling alley, the combination of means for setting the pins, and means for conveying the pins from the alley pit to said setting means, said conveying means comprising an assembly shelf pivoted along an edge and normally held in pin-receiving position, an abutment disposed opposite the lower end of the shelf and having an aperture therethrough, an abutment fixed to the shelf and normally closing said aperture, means permitting said shelf to drop at predetermined intervals, and means for directing a pin disposed behind the abutment fixed to the shelf through said aperture.

66. In a pin setting machine for a bowling alley, the combination of means for setting the pins, and means for conveying the pins from the alley pit to said setting means, said conveying means comprising an assembly shelf having an aperture therethrough and an abutment fixed to the lower edge thereof and opposite said aperture, and means disposed through said aperture for preventing a pin disposed over said aperture from dropping with the shelf, whereby said pin may slide over the top of the abutment when the shelf is dropped.

67. In a pin setting machine for a bowling alley, the combination of a frame having a plurality of apertures extending therethrough in which the pins are adapted to recline in accordance with the arrangement of the spots upon the alley bed when the frame is in normal position, automatic means for supplying pins to said frame, fixed guides at the front of the apertures in said frame for guiding the pins into position on said spots, a plurality of rods adapted to engage beneath the necks of the pins when the latter are in reclining position, and means for raising said rods to bring the pins to upright position in contact with the fixed guides preparatory to depositing them on the alley bed.

68. In a pin setting machine for a bowling alley, the combination of a frame having a plurality of apertures extending therethrough in which the pins are adapted to recline in accordance with the arrangement of the spots upon the alley bed when the frame is in normal position, automatic means for supplying pins to said frame, fixed guides at the front of said apertures for guiding the pins into position on said spots, a plurality of rods adapted to engage beneath the necks of the pins when the latter are in reclining position, and means for raising the rods in an arcuate path to bring the pins to upright position in contact with the fixed guides preparatory to depositing them on the alley bed.

69. In a pin setting machine for a bowling alley, the combination of a frame adapted to deposit a set of pins upon the alley bed and having apertures therethrough in which the pins to be deposited are adapted to rest, a plate carried beneath said frame and shiftable longitudinally thereof and provided with apertures arranged in accordance with the spots on the alley bed and normally disposed in the front of pins carried by said frame, and means for shifting said plate to permit the pins to drop through the apertures in the plate onto the alley bed.

70. In a pin setting machine for a bowling alley, the combination of a frame adapted to deposit pins on the alley bed and having apertures therethrough in which the pins to be deposited are adapted to recline, a plate carried beneath said frame and shiftable longitudinally thereof and having apertures arranged in accordance with the spots on the alley bed and normally disposed in front of the pins reclining in the frame, and means for simultaneously righting the pins carried by the frame and for shifting the plate to dispose the apertures therein beneath the pins to permit the pins to drop through the apertures onto the alley bed.

71. In a pin setting machine for a bowling alley, the combination of a frame adapted to deposit a set of pins upon the alley bed and having apertures in which the pins to be deposited are adapted to recline, a plate carried beneath said frame and shiftable longitudinally thereof and having apertures arranged in accordance with the spots on the alley bed and normally disposed in front of pins carried in said frame, a plurality of magnets secured to the under side of said plate arranged in accordance with the spots on the alley bed and normally disposed beneath pins carried by the frame, and shock-reducing members disposed above the plate and behind the magnets for preventing damage to the magnets by the pins when they are received in the frame.

72. In a pin setting machine for a bowling alley, the combination of a frame adapted to contain a set of pins to be deposited upon the alley bed, a plurality of tracks disposed longitudinally of said frame, a shiftable plate adapted to support the pins in the frame and having apertures through which the pins can be deposited upon the alley bed when the plate is shifted, and brackets secured to said plate and provided with rollers engaging said tracks for shiftably supporting the plate from said frame.

73. In a pin setting machine for a bowling alley, the combination of a pin setter adapted to place a set of pins upon the alley bed, a sweeper adapted to sweep the alley bed prior to the action of said setter, a device for controlling the actuation of said setter, a device for controlling the actuation of said sweeper, a shaft to which said devices are normally locked, a magnet for temporarily unlocking said setter actuating device, and an electric circuit for energizing said magnet.

74. In a pin setting machine for a bowling alley, the combination of a pin setter, a sweeper, a device for actuating said setter, a device for actuating said sweeper, a shaft to which said devices are normally locked, a magnet for temporarily unlocking said setter-actuating device from said shaft, a circuit for energizing said magnet, said circuit comprising a terminal carried by the device for actuating said setter and a terminal mounted on a fixed part of the pin setting machine in position to contact with the terminal on said device when the parts are in normal position.

75. In a pin setting machine for a bowling alley, the combination of a pin setter, a sweeper, a device for actuating said setter, a device for actuating said sweeper, a shaft on which said devices are normally locked, a magnet carried by the device for actuating said setter, a circuit for energizing said magnet, said circuit comprising terminals mounted on the device for actuating said setter and terminals mounted on a fixed part of the machine in position to contact with the terminals on said device when the parts are in normal position.

76. In a pin setting machine for a bowling alley, the combination of a frame provided with a plurality of magnets for lifting pins standing upon the alley bed above the alley bed and for returning them into position upon the alley bed, a sweeper, a device for actuating said frame, a device for actuating said sweeper, a shaft to which said devices are normally locked, a magnet for temporarily unlocking the sweeper-actuating device from said shaft, and an electric circuit for energizing said magnet.

77. In a pin setting machine for a bowling alley, the combination of a frame provided with a plurality of magnets for lifting pins standing upon the alley bed above the alley bed and for returning them into position upon the alley bed, a sweeper, a device for actuating said frame, a device for actuating said sweeper, a shaft to which said devices are normally locked, a magnet for temporarily unlocking said sweeper-actuating device from said shaft, a circuit for energizing said magnet, said circuit comprising a terminal mounted on the device for actuating said sweeper and a terminal mounted on a fixed part of the pin setting machine in position to contact with the terminal on said sweeper-actuating device when the parts are in normal position.

78. In a pin setting machine for a bowling alley, the combination of a frame provided with a plurality of magnets for lifting pins standing upon the alley bed above the alley bed and for returning them into position upon the alley bed, a sweeper, a device for actuating said frame, a device for actuating said sweeper, a shaft to which said devices are normally locked, a magnet carried by the sweeper-actuating device, a circuit for energizing said magnet, said circuit comprising terminals mounted on the device for actuating said sweeper and terminals mounted on a fixed part of the machine in position to contact with the terminals on said device when the parts are in normal position.

79. In a pin setting machine for a bowling alley, the combination of a pin setter, a sweeper means for automatically lifting standing pins from the alley bed, and means for controlling and timing the operation of said setter, sweeper and pin-lifting means, said controlling means comprising a plurality of electrical circuits, and means for interrupting said circuits throughout each operation of the machine.

80. In a pin setting machine for a bowling alley, the combination of a frame adapted to deposit a set of pins upon the alley bed in one operation of the machine and to lift standing pins above the alley bed and replace them in position thereupon in another operation of the machine, a sweeper for clearing the alley bed prior to the action of said frame in the first mentioned operation and after the pins are lifted in the second mentioned operation, a rotatable device for actuating said frame, a rotatable device for actuating said sweeper, and electrically controlled means for starting each operation of the machine, said means comprising an electric circuit for each operation, a part of said circuit being carried by each device whereby both circuits are interrupted when either device is out of normal position.

81. In a pin setting machine for a bowling alley, the combination of a sweeper, a vertically movable frame provided with a plurality of magnets adapted to lift pins standing upon the alley bed, means for imparting to the frame a pair of vertical reciprocations, one to pick up the standing pins and one to return them to position, means for moving the sweeper along the alley bed after the pins have been lifted and before they have been returned and means for delivering electrical energy to the pin-lifting magnets during the last half of the first reciprocation of the frame and the first half of the last reciprocation, said means comprising a disk carrying a cam, means for imparting to the disk one complete revolution, a lever adapted to engage said cam after the disk has passed through an angle of 90° and engage said cam while the disk passes through an angle of 180°, a source of electrical energy, a switch closed by the lever while in engagement with the cam, and conductors connecting the source of electrical energy the switch and the magnets.

82. In a pin setting machine for a bowling alley, the combination of a frame adapted to deposit a set of pins upon the alley bed in one operation of the machine and having a plurality of magnets adapted to lift standing pins from the alley and replace them upon the alley bed thereafter in another operation, a source of electrical energy, a circuit for delivering energy from said source to said magnets, and means for interrupting said circuit during the first mentioned operation, said means comprising a movable member adapted to be disposed in one position in the first mentioned operation and in another position in the second mentioned operation, a terminal carried by said member, and a terminal mounted on a fixed part of the machine in position to contact with the first mentioned terminal to complete the circuit when the movable member is in the second mentioned position.

83. In a pin setting machine for a bowling alley, the combination of a frame adapted to deposit a set of pins upon the alley bed in one operation and having a plurality of magnets adapted to lift standing pins from the alley and replace them upon the alley bed thereafter in another operation, a source of electrical energy, a circuit for delivering energy from said source to the said magnets, and means for interrupting said circuit during the first mentioned operation, said means comprising a pivotally mounted member adapted to be disposed in one position in the first mentioned operation and in another position in the second mentioned operation, a terminal carried by said member, and a terminal mounted on a fixed part of the machine in position to contact with the first mentioned terminal to complete the circuit when the pivotally mounted member is in the second mentioned position.

84. In a pin setting machine for a bowling alley, a setter comprising a frame having pockets therein to hold the pins, and a plate slidably supported by said frame and having openings therein adapted to register with said pockets.

85. In a pin setting machine for a bowling alley, the combination of a setter comprising a frame having pockets therein to hold the pins and a plate provided with a plurality of openings slidably supported on said frame, and means for moving said plate to dispose said openings beneath said pockets to release the pins therefrom.

86. In a pin setting machine for a bowling alley, the combination of a setter comprising a frame having pockets therein to hold the pins in reclining position and a plate provided with a plurality of openings slidably supported on said frame, means for righting the pins, and means for moving said plate to dispose said openings beneath said pockets to release the pins therefrom.

87. In a pin setting machine for a bowling alley, the combination of a setter comprising a frame having pockets therein to hold the pins and a plate slidably supported by said frame and provided with a plurality of openings adapted to register with said pockets, and automatic means for supplying pins to said setter.

88. In a pin setting machine for a bowling alley, the combination of a setter comprising a frame having pockets therein to hold the pins and a plate slidably supported by said frame and provided with a plurality of openings adapted to register with said pockets, a distributer above said setter, and automatic means for supplying pins to said distributer.

89. In a pin setting machine for a bowling alley, the combination of a setter comprising a frame having pockets therein to hold the pins and a plate slidably supported by said frame and provided with a plurality of openings adapted to register with said pockets, a distributer above said setter, means to assemble a set of pins for delivery to said distributer, and automatic means for supplying pins to said assembly means.

90. In a pin setting machine for a bowling alley, the combination of a setter comprising a frame having pockets therein to hold the pins and a plate slidably supported by said frame and provided with a plurality of openings adapted to register with said pockets, a distributer above said frame, means for assembling a set of pins for delivery to said distributer, and means for elevating the pins from the alley pit and delivering them to said assembly means.

ERNEST HEDENSKOOG.

Witnesses:
Wm. O. Belt,
J. C. Carpenter.